(12) United States Patent
Nagae et al.

(10) Patent No.: US 7,027,195 B2
(45) Date of Patent: Apr. 11, 2006

(54) COLOR IMAGE PROCESSING APPARATUS AND COLOR IMAGE PROCESSING METHOD

(75) Inventors: Akiko Nagae, Kawasaki (JP); Nobuaki Usui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 982 days.

(21) Appl. No.: 09/791,861

(22) Filed: Feb. 26, 2001

(65) Prior Publication Data

US 2002/0005965 A1 Jan. 17, 2002

(30) Foreign Application Priority Data

Jun. 19, 2000 (JP) .............................. 2000-183170

(51) Int. Cl.
*G03F 3/08* (2006.01)
(52) U.S. Cl. ...................... 358/518; 358/2.1; 358/3.23; 358/537; 358/538
(58) Field of Classification Search ................ 358/518, 358/2.1, 3.23, 537, 538
See application file for complete search history.

(56) References Cited

U.S. PATENT DOCUMENTS

| | | | |
|---|---|---|---|
| 4,831,409 A * | 5/1989 | Tatara et al. ................. 347/115 |
| 5,181,068 A * | 1/1993 | Morikawa ..................... 355/77 |
| 5,502,579 A | 3/1996 | Kita et al. | |
| 5,774,238 A * | 6/1998 | Tsukada ...................... 358/529 |
| 5,920,645 A * | 7/1999 | Aida ........................... 382/167 |
| 6,027,201 A * | 2/2000 | Edge ............................ 347/19 |
| 6,184,915 B1 * | 2/2001 | Atsumi et al. .............. 347/251 |

FOREIGN PATENT DOCUMENTS

| | | |
|---|---|---|
| JP | HEI 7-087346 | 3/1995 |
| JP | HEI 7-107307 | 4/1995 |

* cited by examiner

*Primary Examiner*—Kimberly Williams
*Assistant Examiner*—Michael Burleson
(74) *Attorney, Agent, or Firm*—Staas & Halsey LLP

(57) ABSTRACT

Present invention relates to a color image processing apparatus including an input color chip making unit for making a color chip of the selected color signal as an input color chip, an output color chip making unit for subjecting the selected color signal to the under color removal processing carried out in an UCR processing unit with two or more parameters different from one another, thereby making a color chip of the obtained color signal as an output color chip for each parameter, and a parameter determining unit for selecting among the parameters a parameter which provides the minimum difference between the input color chip and the output color chip, wherein the UCR processing unit subjects the input color signal to the UCR processing by using the parameter selected by the parameter determining unit. With this, a color image desired by a user can be created.

22 Claims, 15 Drawing Sheets

FIG. 6

| C | M | Y |
|---|---|---|
| 0 | 0 | 0 |
| 0 | 0 | 32 |
| 0 | 0 | 64 |
| 0 | 0 | 96 |
| 0 | 0 | 128 |
| 0 | 0 | 160 |
| 0 | 0 | 192 |
| 0 | 0 | 224 |
| 0 | 0 | 255 |
| 0 | 32 | 0 |
| 0 | 32 | 32 |
| 0 | 32 | 64 |
| 0 | 32 | 96 |
| 0 | 32 | 128 |
| ⋮ | ⋮ | ⋮ |
| 255 | 255 | 255 |

COLOR IMAGE PROCESSING APPARATUS AND COLOR IMAGE PROCESSING METHOD

BACKGROUND OF THE INVENTION (1) Field of the Invention

The present invention relates to a color image processing apparatus and a color image processing method, for example, in which an input color signal composed of three components, namely CMY, is subjected to an UCR processing using a K-separation, for example.

(2) Description of Related Art

In general, an image forming apparatus such as a printer for outputting color images, characters or the like on a printing medium such as a printing sheet or the like, reproduces a particular color by appropriately blending three chromatic components (color signals) of CMY (Cyan, Magenta, and Yellow) or four chromatic components (color signals) of CMYK.

In such an image forming apparatus, it is desired to reduce the amount of color materials used in color printing as much as possible, since the color material is generally expensive. On the other hand, there is known a method of adjusting color reproduction in which a color image composed of the three chromatic components of CMY is added with a K (black)-separation (component), whereby the color image is adjusted in a desired manner. Further, there is a problem that when a color image is formed, a desired amount of color material cannot be fixed on a sheet of printing material due to the property of the medium or color material (ink, toner or the like).

If the three components of CMY are blended at an equal amount, theoretically, a color of gray or color near to gray can be produced. By using the nature of the color blending, any color can be subjected to a UCR (UCR) processing in which the gray component of three components of CMY is removed from the color and replaced with the K (black) component. With this processing, the color to be presented can be produced with a smaller amount of color materials of CMY components or the color image can be adjusted in terms of color reproduction.

FIG. 15 is a diagram conceptually illustrative of a general UCR processing. A general processing of UCR processing will hereinafter be described with reference to FIG. 15.

The initial step is to find the smallest content of component of the three CMY components which constitute an input color signal (in the example shown in FIG. 15, the smallest component is Y-component). Then, the predetermined rate (UCR rate) is multiplied with the smallest content to yield the amount used in K-separation, or the rate of UCR.

Then, the input color signal is subtracted by the amount of CMY components each equal to the UCR rate, and the input color signal is added with the K-separation component of which amount is equal to the UCR rate (K-separation adding amount). Thus, the UCR processing is carried out.

In the example shown in FIG. 15, the UCR processing is carried out at the UCR rate of 100%. If the UCR rate is set to 100%, as in the example shown in FIG. 15, a color signal of the amount equal to the smallest amount of color signal (in the example shown in FIG. 15, the smallest component is Y-component) of the respective CMY components constituting the input color signal is replaced with the K-separation as the UCR rate.

When the above-described UCR processing is carried out upon printing a color image, the amount of consumed color ink (CMY) can be saved and the color image can be formed economically.

If the UCR rate is set to 100% as in the above-described example, the black version is introduced over the whole concentration region. Therefore, it becomes difficult to take a good matching between the three color inks (CMY) and the black ink. Further, a light portion of the image is also added with a considerable amount of black component, the background texture of the image at the portion tends to be dirty due to the black component. For this reason, a skeleton black method in which the UCR rate is set to a relatively low level is ordinarily utilized.

However, according to the general method of the conventional UCR method, since a part of the CMY color components are replaced with the K-separation, the color reproducibility is greatly deteriorated. For example, the lightness of the color image can change from the separation before undergoing the UCR processing and the separation after undergoing the UCR processing. Also, there is also a problem that the deepness of the color image cannot be completely reproduced after the UCR processing.

Particularly, in a conventional UCR processing method, a parameter (UCR rate), arbitrarily determined depending on the input color signal, is not utilized but a predetermined parameter is utilized for the UCR processing. Therefore, it is difficult to improve the color reproducibility of an image after undergoing the UCR processing. That is, it is difficult to determine a parameter which can provide good balance for every color. Further, to determine a parameter for improving the color reproducibility depending on the input color signal requires try-and-error operation and an operator with highly developed skill.

Japanese Patent Laid-Open (kokai) No. HEI 7-87346 discloses an UCR processing method in which an inputted color signal is converted into a color signal on a color space which is independent of the characteristic of the apparatus and has a uniform property in terms of a visual sense, and an UCR rate is calculated by using the saturation signal of the converted color signal, whereby an accurate color reproduction is accomplished through a simple calculation without necessity of an adjustment in parameter based on the operator's experience.

In this method disclosed in Japanese Patent Laid-Open (kokai) No. HEI 7-87346, however, the color reproducibility is dependent of the color space with the uniform property in terms of a visual sense. Therefore, when a color is actually outputted from the printing device or the like, for example, if it is requested to produce a gradation from a monochrome tone to a primary color (i.e., a color represented by only one color component of CMY components) or to produce a gradation from the monochrome tone to a secondary color (i.e., a color represented by two color components of the CMY components), the UCR rate does not vary uniformly in response to the input color signal. Therefore, the color reproducibility sometimes loses smoothness.

Further, according to the above-described method, the parameter is determined depending on only the degree of saturation. Therefore, if color signals have different lightness or hue but have the same degree of saturation, the color signals will be subjected to the UCR processing with the same parameter, i.e., the same K-separation is added to the color signals. Thus, to a part of an image such as a skin of a human, where with a hard color reproducibility or muddy color representation is not desired, K-separation is also added uniformly, which tends to prevent the reproduction of a color image with a quality desired by the user.

Also, Japanese Patent Laid-Open (kokai) No. HEI 7-107307 discloses a method in which the degree of saturation is calculated based on the input color signal, and the degree of saturation is utilized as a parameter of the UCR processing, in order to improve the color reproducibility in a high saturation area. Also in the method of Japanese Patent Laid-Open (kokai) No. HEI 7-107307, however, the parameter is determined depending on only the degree of saturation. Therefore, since this method does not cope with the difference in lightness of hue of the image, it is difficult to create a color image with a quality desired by the user.

SUMMARY OF THE INVENTION

The present invention is made in view of the above aspect. An object of the present invention is to provide a color image processing apparatus and a color image processing method in which the UCR processing is carried out by using a parameter which provides minimum difference between the color representation before undergoing the UCR processing and the color representation after undergoing the UCR processing, in order to create a color image with a quality desired by the user.

To this end, according to the color image processing apparatus and the color image processing method of the present invention, a color signal is selected as a selected color signal from an input color space as an object of UCR, and a color chip of the selected color signal is made as an input color chip, the selected color signal is subjected to the UCR processing with two or more parameters different from one another, a color chip of the obtained color signal after undergoing the UCR processing is made as an output color chip for each parameter, a parameter which provides the minimum difference between the input color chip and the output color chip is selected from the parameter, and the UCR processing is carried out on the input color signal by using the selected parameter.

Further, according to the present invention, there are provided a color image processing apparatus and a color image processing method in which a color chip is selectively designated as a designated color chip, from an arbitrary color signal within an input color space as an object of UCR, the color signal corresponding to the designated color chip is subjected to the UCR processing with two or more parameters which is different from one another, a color chip of the color signal after undergoing the UCR processing is made as an output color chip for each parameter, a parameter which provides the minimum difference between the input color chip and the output color chip is selected from the parameters, and the UCR processing is carried out on the input color signal by using the selected parameter.

At this time, a color signal interval may be designated, the selected parameter and the color signal corresponding to the selected parameter may be held in a parameter table so that the parameter and the color signal are associated with each other, a plurality of color signals which are arrayed at the designated interval may be selected as the selected color signal, a color chip of the selected color signal may be made as the input color chip, the UCR processing may be carried out by using the parameter held in the parameter table, and if the parameter corresponding to the input color signal is not held in the parameter table, a parameter corresponding to the input color signal may be calculated by the interpolation calculation and the UCR processing may be carried out by using the parameter made by the interpolation calculation.

Also, the color signals may be designated so that the color signals are arrayed at a regular interval in terms of the input level value of the color signal. Alternatively, the color signals may be designated so that the color signals are arrayed at a regular interval in terms of the output lightness of the color signal.

Further, if the parameter corresponding to the input color signal is not held in the parameter table, a parameter corresponding to the input color signal may be made by a linear interpolation method. Alternatively, if the parameter corresponding to the input color signal is not held in the parameter table, a parameter corresponding to the input color signal may be made by a polynomial approximation interpolation method.

Further, according to the present invention, there are provided a color image processing apparatus and a color image processing method in which a lightness coefficient and a saturation coefficient are calculated based on the input color signal, an UCR rate is calculated by using the obtained lightness coefficient and the saturation coefficient, and the input color signal is subjected to the UCR processing by using the UCR rate obtained by the calculation.

At this time, variable curvatures may be designated for determining the saturation coefficient and the lightness coefficient, respectively, and the lightness coefficient and the saturation coefficient may be calculated based on the input color signal and the curvature.

Further, according to the present invention, there are provided a color image processing apparatus and a color image processing method in which a parameter selection is carried out to find a parameter that provides the minimum difference between the input color chip corresponding to a predetermined input color signal and the output color chip corresponding to the color signal obtained by subjecting the predetermined input color signal to the UCR processing, and then the input color signal is subjected to the UCR processing by using the selected parameter.

As described in detail above, the color image processing apparatus and the color image processing method of the present invention have the following merits or advantages.

(1) The parameter selection is carried out to find a parameter that provides the minimum difference between the input color chip or the designated color chip and the output color chip, and then the UCR processing is carried out on the input color signal by using the selected parameter. Therefore, it is possible to carry out UCR processing without unnatural jump (discontinuity) of tone or unmatched color blending with a smooth color reproducibility. Accordingly, it becomes possible to create a color image with a quality desired by the user.

(2) According to the arrangement of the present invention, the interval between input color signals can be designated. Therefore, the number of the color signals and parameters to be held in the parameter table can be adjusted. Thus, the number of data pieces utilized upon interpolation calculation can be adjusted.

(3) According to the arrangement of the present invention, there is prepared a parameter table having parameters and color signals corresponding to the parameters held therein so that the parameters and the color signals are associated with each other. Therefore, it is unnecessary to calculate parameters for all input color signals, namely, for the input color signals which parameters are held in the parameter table, it is not necessary to calculate parameters. Thus, it is possible to shorten the time it takes to calculate the parameters and the UCR processing can be carried out at a short period of time. Further, it becomes possible to attain a smooth color reproducibility without conflicting between colors or unmatched blending of colors.

(4) According to the arrangement of the present invention, the UCR processing is carried out by using the parameter held in the parameter table, and if the parameter corresponding to the input color signal is not held in the parameter table, a parameter corresponding to the input color signal is calculated by the interpolation calculation and the UCR processing is carried out by using the parameter made by the interpolation calculation. Therefore, it is unnecessary to calculate parameters for all input color signals. Thus, it becomes possible to shorten the time it takes to calculate the parameters and the UCR processing can be carried out at a short period of time. Furthermore, it is possible to attain a smooth color reproducibility without conflicting between colors or unmatched blending of colors.

(5) According to the arrangement of the present invention, the interval of color signals can be designated such that the color signals are arrayed in even interval in terms of input level value. With this, a color chip can be determined swiftly and interpolation can be effected with ease on the output color space. Accordingly, it becomes possible to attain a smooth color reproducibility without conflicting or unmatched blending of colors.

(6) According to the arrangement of the present invention, the interval of input color signals can be designated such that the color signals are arrayed in even interval in terms of output lightness. With this, it is possible to adopt the UCR processing to the human visual sensation of lightness by using a parameter table which varies faithfully with the change of lightness of input color signals. Further, as will be described later on, when interpolation is effected on the output color signal, conflict between colors deriving from the interpolation will be made small, thereby attaining a smooth color reproducibility without unmatched blending of colors.

(7) According to the arrangement of the present invention, the interpolation calculation can be carried out at a high speed by using a linear interpolation method, and the UCR processing can be carried out with a smooth color reproducibility.

(8) Further, according to the arrangement of the present invention, the interpolation calculation can be carried out more precisely by using a polynomial approximation interpolation method, and the UCR processing can be carried out with a smooth color reproducibility.

(9) According to the arrangement of the present invention, a parameter is calculated by using the lightness coefficient and saturation coefficient obtained from the color components of an input color signal. Therefore, the image after undergoing the UCR processing contains no conflict between colors or mismatching in blended colors upon outputting the image. Further, it is possible to realize a smooth color reproducibility without unnatural discontinuity between adjacent pixels or the like in the saturation direction and lightness direction.

(10) According to the arrangement of the present invention, when the saturation coefficient and the lightness coefficient are determined by designating predetermined curvatures so as to adjust the saturation coefficient and the lightness coefficient desirably. Thus, it becomes possible to adjust the degree of effect of UCR processing while maintain the smooth color reproducibility.

BRIEF DESCRIPTION OF THE DRAWINGS

FIG. 6 is a diagram showing an example of arrangement of a selected color signal;

DESCRIPTION OF THE PREFERRED EMBODIMENTS

Embodiments of the present invention will hereinafter be described with reference to drawings.

Figure 1:
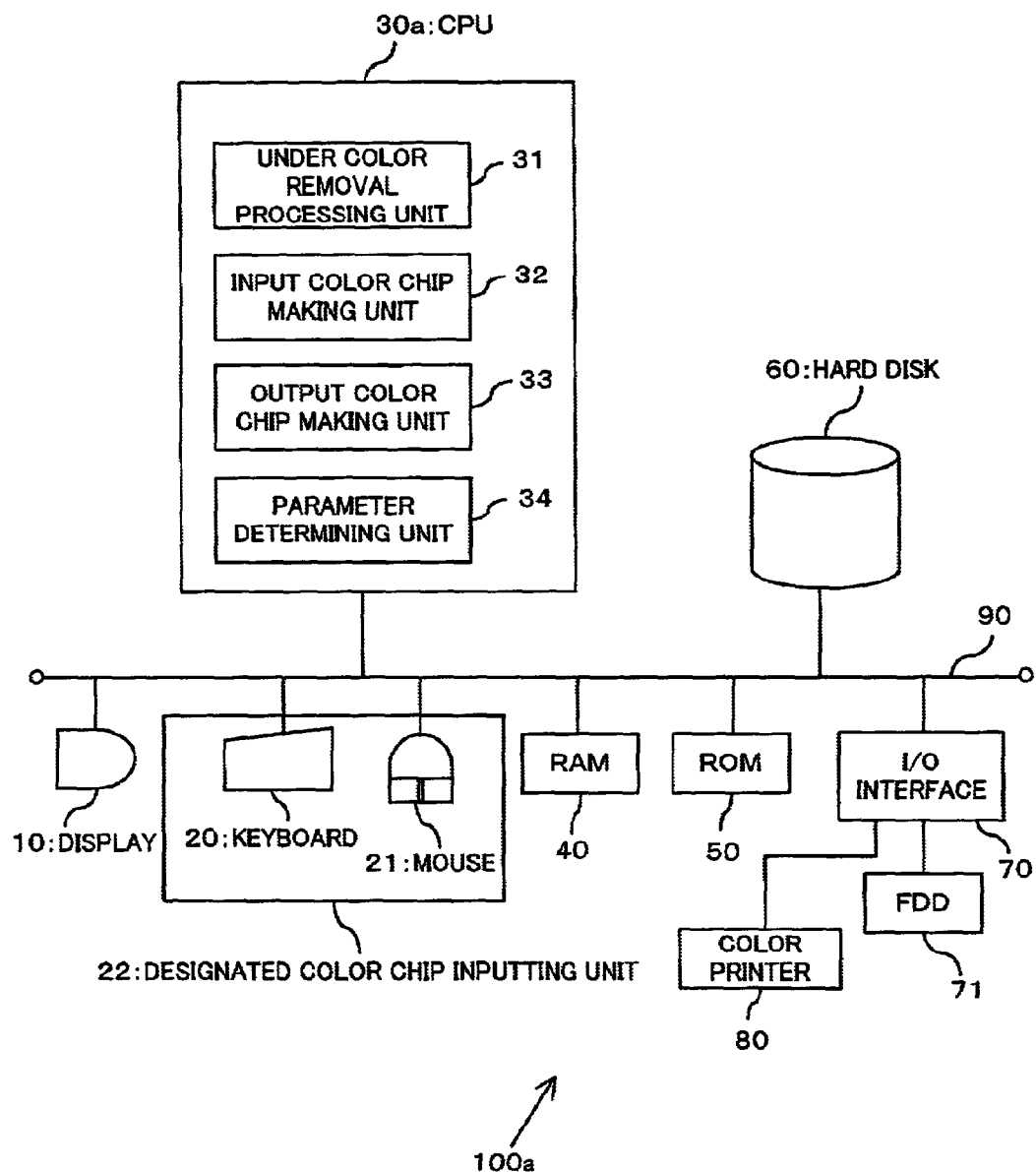
FIG. 1 is a block diagram showing a hardware arrangement of a color image processing apparatus together with a function arrangement thereof as a first embodiment of the present invention.

(A) FIG. 1 is a block diagram showing a hardware arrangement of a color image processing apparatus together with a function arrangement thereof as a first embodiment of the present invention. As shown in FIG. 1, a color image processing apparatus 100a of the first embodiment is arranged as a computer system which includes a display 10, a keyboard 20, a mouse 21, a CPU 30a, RAM 40, a ROM 50, a hard disk 60 and an I/O interface 70. These function components are connected to one another so that they can communicate with one another through a bas 90.

The display 10 is a unit for displaying thereon a result of arithmetic operation carried out by the CPU 30a which will be described later on. The I/O interface 70 is a unit functioning as an interface for transmitting data between the computer system and a external peripheral apparatus such as floppy disk drive (FDD) 71, a color printer, and so on. Also, the color printer 80 is an apparatus for forming a color image on a sheet of printing medium such as a sheet of paper or the like.

The RAM (Random Access Memory) 40 serves as a working area when the CPU 30a carries out an arithmetic operation. The ROM (Read Only Memory) 50 is a memory in which a BIOS (Basic Input Output System) or the like is stored.

The keyboard 20 and the mouse 21 are devices by which a user of the computer system inputs various commands and information into the computer system. Also, the keyboard 20 and the mouse 21 are utilized when the user selectively designates a color chip as a designated color chip from an arbitrary color signals included in an input color space as an object of the UCR. In other words, the keyboard 20 and the mouse 21 are arranged to function as a designated color chip inputting unit 22.

The CPU 30a is a unit for controlling the operations of the display 10, the hard disk 60, the I/O interface 70 and so on. Also, the CPU 30a is arranged to execute various applications stored in the hard disk 60, the RAM 40, and the ROM 50, whereby the CPU 30 a can serve as an under color removal processing unit 31, an input color chip making unit 32, an output color chip making unit 33, and a parameter determining unit 34.

The CPU 30a carries out the UCR processing (hereinafter sometimes simply referred to as UCR) such that a part of the tricolor signal of CMY is removed and replaced with a K (black) separation (component) so that the set of color signals is converted into another set of color signals formed of four colors, or CMYK. Therefore, the CPU 30a also serves as a under color removal processing unit 31.

In the following description of the first embodiment, the respective color components of C, M, Y and K are represented by eight-bit digit (0 to 255) for convenience.

Further, the CPU 30a carries out the UCR processing in a color retaining mode, in which the UCR processing is carried out in such a manner that the color formed after subjecting the input (inputted) color signal to the UCR processing is approximated to the color before subjecting the input color signal to the UCR processing as much as possible, and a color designating mode, in which the UCR processing is carried out in such a manner that the color formed after subjecting the input color signal to the UCR processing is approximated to the color which is designated by the user in advance.

When the UCR processing is carried out in the color retaining mode, the CPU 30a selects a particular color signal in the input color space, and a color chip of the selected color signal (hereinafter referred to as selected color signal) is printed by using the color printer (input color chip making unit, output color chip making unit) 80.

FIGS. 2(a) to 2(c) are diagrams each showing an example of a color chip made by the input color chip making unit 32 and the color printer 80. That is, FIG. 2(a) is a diagram showing an input color chip when the selected color signal is (0, 0, 0), FIG. 2(b) is a diagram showing an input color chip when the selected color signal is (128, 128, 128), and FIG. 2(c) is a diagram showing an input color chip when the selected color signal is (255, 255, 255).

The CPU 30a is driven cooperatively with the color printer 80 so that a color signal is selected as a selected color signal from color signals included in the input color space of the object of the UCR, whereby the CPU 30a functions as the input color chip making unit 32 for making a color chip of the selected color signal as an input color chip.

The color chips made by the above-described manner may be those having a constant linear distribution with respect to the input color space. Alternatively, the color chips made may be those having a distribution in proportion to the curvature of the lightness.

Figure 2:
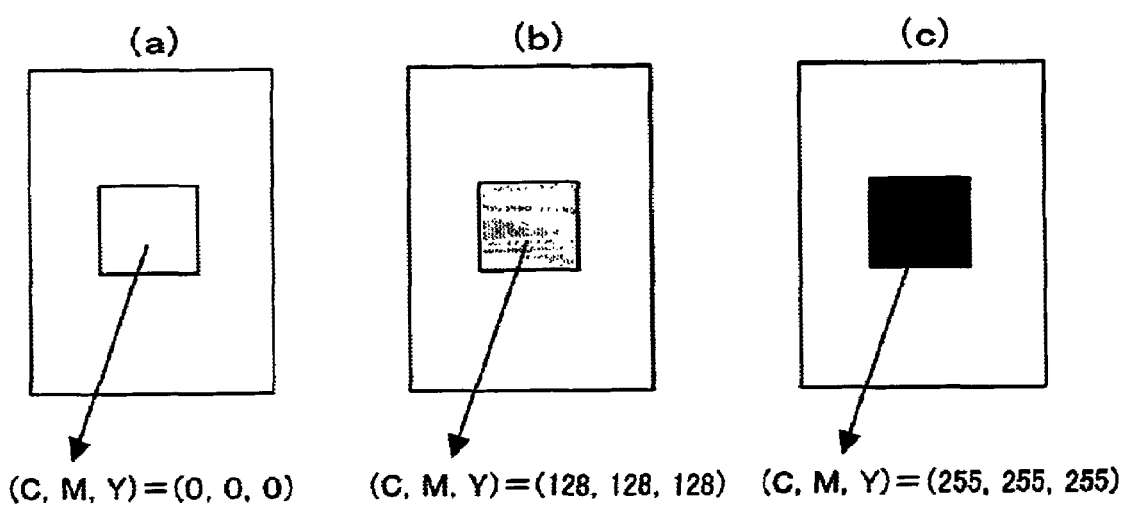
FIGS. 2(a) to 2(c) are diagrams each showing an example of a color chip made by an input color chip making unit.

While in the above description and FIG. 2, although there are examples of color signal combinations in which at least one of the C, M and Y components constituting the color signal is "0", actually, the group of the color signals containing "0"in the color component will not undergo the UCR processing.

On the other hand, when the color signal is subjected to the UCR processing in the color retaining mode, initially, the user designates a particular color chip as a designated color chip by using the keyboard 20 and the mouse 21. In more detail, when the color chip designation is carried out in the color image processing apparatus 100a of the present first embodiment, the keyboard 20 and the mouse 21 serve as the designated color chip input unit 22 by which the user selectively designates a color chip as the designated color chip on an arbitrary color signal within the input color space as the target of the UCR.

The CPU 30a is also arranged to effect the UCR processing on the above-described selected color signal (when the UCR processing is carried out in the color designating mode) or the color signal of the designated color chip (hereinafter sometimes referred to as designated color signal upon color retaining mode) by using two or more parameters (UCR rates). Further, the CPU 30a (output color chip making unit 33) is also arranged to drive the color printer 80 to print a color chip as the output color chip by using the color signal which has been to the UCR processing. In the following description of the first embodiment, when a term "parameter" is introduced, the term means the UCR rate.

Further, the CPU 30a is arranged to store the data of the parameter utilized for the UCR processing into the RAM 40 or the hard disk 60.

When the UCR processing is carried out in the color retaining mode, the CPU 30a makes a color chip (input color chip) of the arbitrary selected color signal (selected color signal). Then, the CPU 30a carries out the UCR processing on the selected color signal by using two or more parameters. Thereafter, the CPU 30a makes the color chip (output color chip) of the color signal after undergoing the UCR processing.

The user evaluates the output color chip by comparing the output color chip with the input color chip, and selects an output color chip from a groups of color chips that provides the minimum difference from the input color chip.

Further, the CPU 30a (parameter determining unit 34) acquires a parameter of the output color chip which provides the least difference from the input color chip deriving from the comparison. Then, the CPU 30a stores the acquired data of the parameter into the RAM 40 or the hard disk 60.

When the UCR processing is carried out in the color designating mode, the user prepares a desired color chip (designated color chip) in advance. The CPU 30a (under color removal processing unit 31) carries out the UCR processing by using two or more parameters on the designated color signal of the designated color chip.

Also, the CPU 30a (output color chip making unit 33) makes each color chip (output color chip) of the color signals formed by the UCR processing respectively corresponding to the plurality of parameters. Then, the user evaluates the plurality of output color chips by comparing each output color chip with the designated color chip and selects, from the plurality of color chips, an output color chip that provides the minimum difference in color from the designated color chip.

Further, the CPU 30*a* (parameter determining unit 34) obtains a parameter of the output color chip which provides the minimum difference from the input color chip deriving from the comparison on each of the plurality of output color chips. Then, the CPU 30*a* stores the obtained data of the parameter into the RAM 40 or the hard disk 60.

That is, the CPU 30*a* (parameter determining unit 34) is arranged to select a parameter that provides the minimum difference between the input color chip corresponding to the predetermined input signal and the output color chip corresponding to the color signal obtained by subjecting the predetermined input color signal to the UCR processing in the under color removal processing unit 31. Further, the CPU 30*a* (under color removal processing unit 31) also is arranged to carry out the UCR processing on the input color signal by using the parameter selected by the parameter determining unit 34.

When the output color chip is compared with the input color chip or the designated color chip, the comparison may be made in such a manner that the designated color chip and the output color chip are measured in an optical manner and the measurement result is evaluated based on the CIE (Commission Internationale d'Eclairage) color difference. Alternatively, the output color chip and the input color chip may be compared with each other by subjective observation of a user's vision in a manner known as bisection algorism.

The following is a description for a method of comparing a plurality of output color chips with a input color chip or with a designated input color chip by using the bisection algorism.

(i) A selected color signal or a designated color signal is subjected to the UCR processing by using two parameters with a sufficient distance (e.g., a UCR rate=0%, 100%). Then, a color chip for each color signal after undergoing the UCR processing is made by the color printer 80.

(ii) The made two output color chips are compared with the input color chip or the designated color chip, and one of the output color chips with the minimum difference from the input color chip or the designated color chip is selected (e.g., the UCR rate=100%).

(iii) An intermediate parameter located between the two parameters previously utilized in the UCR processing (UCR rate=0%, 100%) is determined by calculation (e.g., UCR rate=50%).

(iv) The UCR processing is carried out on the selected color signal or the designated color signal by using the newly determined intermediate parameter (UCR rate=50%), and a color chip (output color chip) of the color signal after undergoing the UCR processing is made.

(v) Then, the output color chip of the newly determined parameter and the aforesaid output color chip (at UCR rate of 100%) are compared with each other, and one of the output color chips with the smaller difference from the input color chip or the designated color chip is selected.

(vi) Thereafter, the above processes of (iii) to (v) are repeated until a parameter providing the minimum difference in color from the input color chip or the designated color chip is determined.

Then, the CPU 30*a* (under color removal processing unit 31) carries out the UCR processing on the input color signal by using the parameter selected by the parameter determining unit 34.

Figure 3:
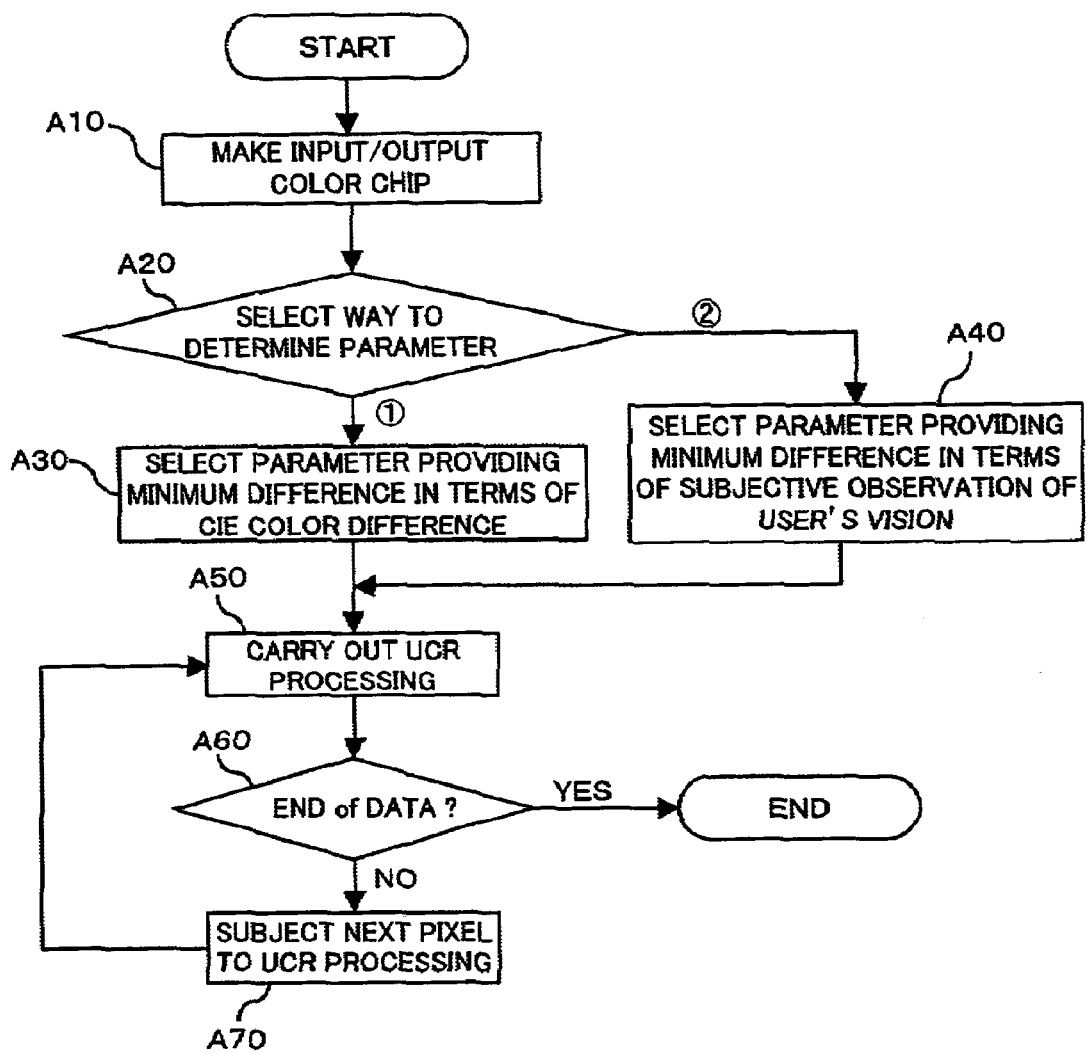
FIG. 3 is a flowchart for explaining a processing of the color image processing apparatus in a color retaining mode as the first embodiment of the present invention.

Description will be made on the processing carried out in the color retaining mode by the color image processing apparatus as the first embodiment of the present invention, with reference to a flowchart in FIG. 3 (step A1 to A70).

The CPU 30*a* selects a proper color signal from the input color space as a selected color signal. Then, the color chip (input color chip) of the selected color signal is made by the function of the input color chip making unit 32 of the CPU 30*a* and the color printer 80. Also, the CPU 30*a* carries out the UCR processing on the color signal by using two or more parameters. Thereafter, the CPU 30*a* makes a color chip (output color chip) of the color signal after undergoing the UCR processing for each parameter by using the function of the output color chip making unit 33 and the color printer 80 (step A10).

Then, the CPU 30*a* confirms a way to determine the parameter (step A20). The user may input a command for designating the way to determine the parameter by using the keyboard 20 or the mouse 21. The way to determine the parameter may be set in advance.

At this time, if the user selects, as a way to determine a parameter, a parameter providing the minimum difference in terms of CIE color difference (see Route ① of step A20), the CPU 30*a* optically measures each of the output color chips for the respective and selects an output color chip providing the minimum difference from the input color chip in terms of the CIE color difference (step A30).

Alternatively, if the user selects, as a way to determine a parameter, a parameter providing the minimum difference in terms of the subjective observation of the user's vision (the bisection algorism) (see Route ② of step A20), the CPU 30*a* selects an output color chip providing the minimum color difference from the input color chip in response to the designation of the user who is comparing each of the output color chips of the respective parameters with the input color chip by the subjective observation of the user's vision (step A40).

Thereafter, the CPU 30*a* carries out the UCR processing on the input color signal by using the parameter, obtained in the above step A30 or A40, which provides the minimum difference in color between the input color chip and the output color chip (step A50).

Then, the CPU 30*a* determines whether the all of the input color signals are subjected to the UCR processing or not (step A60). If it is determined that all of the input color signals have not been subjected to the UCR processing (see NO route of step A60), the next pixel is made to undergo the UCR processing (step A70) and the processing is returned to step A50. Conversely, if it is confirmed that all of the input color signals have been subjected to the UCR processing (see YES route of step A60), the CPU 30*a* terminates the UCR processing.

Figure 4:
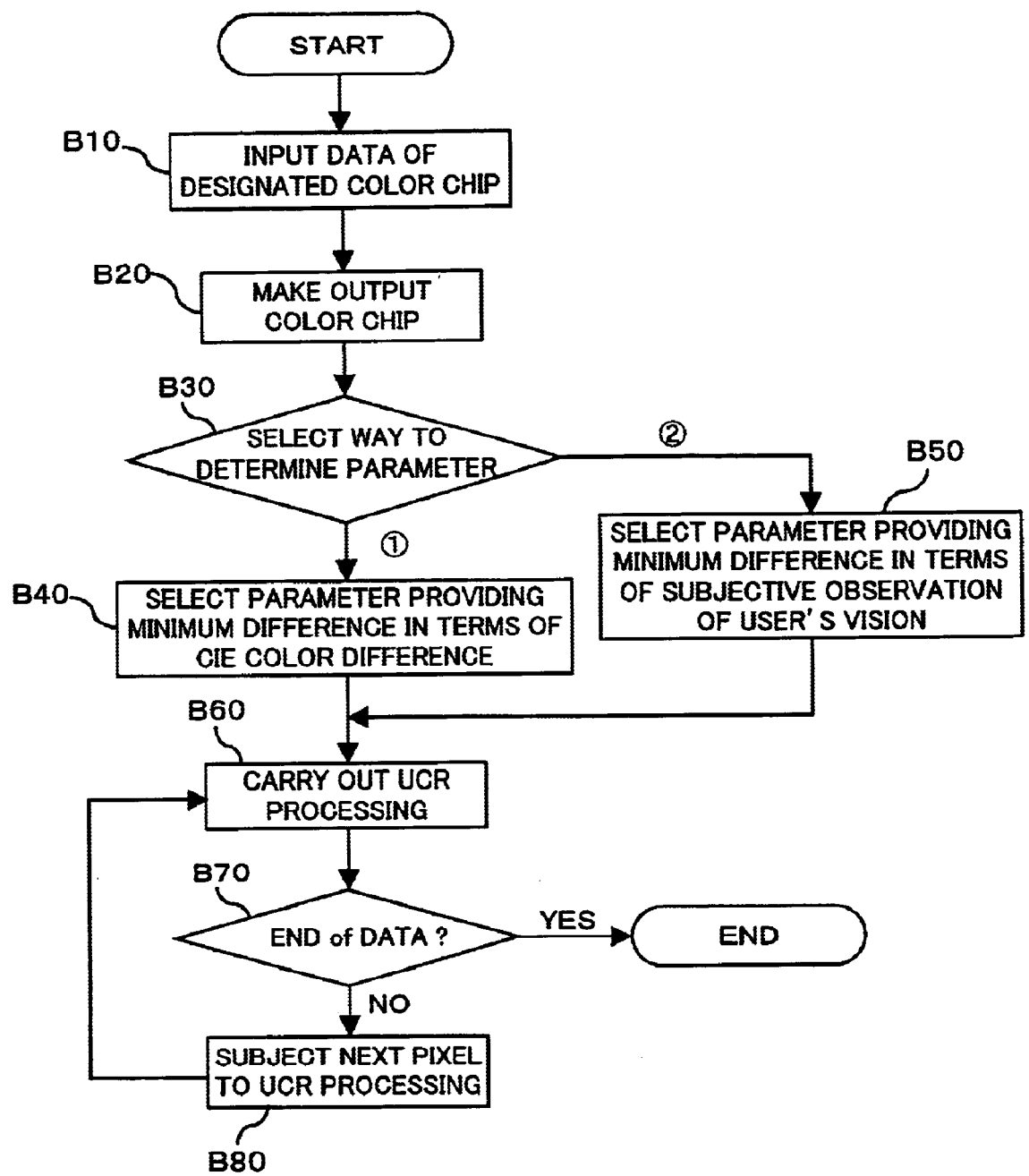
FIG. 4 is a flowchart for explaining a processing of the color image processing apparatus in a color designating mode as the first embodiment of the present invention.

Next, description will be made on the processing carried out in the color designating mode by the color image processing apparatus as the first embodiment of the present invention, with reference to a flowchart in FIG. 4 (step B10 to B80).

For example, the CPU 30*a* selects a plurality of proper color signals from the input color space as selected color signals and makes the color chips (input color chips) of the selected color signals. Then, the user designates a desired color chip from the group of the color chips as a designated color chip (step B10). The user may register a color chip prepared in advance as the designated color chip, instead of the selection of the desired color chip from the group of color chips made by the CPU 30*a*.

Thereafter, the CPU 30*a* carries out the UCR processing on the color signal (designated color signal) corresponding to the designated color chip by using two or more parameters. Then, the CPU 30*a* makes a color chip as an output color chip of each color signal obtained by undergoing the UCR processing for each parameter by using the color printer 80 (step B20).

Then, the CPU 30*a* confirms a way to determine the parameter (step B30). At this time, the user inputs a command for designating the way to determine the parameter by using the keyboard 20 or the mouse 21. The way to determine the parameter may be stored in the ROM or the hard disk in advance.

If the user selects, as a way to determine a parameter providing the minimum difference in terms of CIE color difference (see Route ① of step B30), the CPU 30*a* optically measures the designated color chip and each of the output color chips for the respective parameters and selects, from the designated color chip, an output color chip providing the minimum difference in terms of the CIE color difference (step B40).

Alternatively, if the user selects, as a way to determine a parameter providing the minimum difference in terms of the subjective observation of the user's vision (the bisection algorism) (see Route ② of step B30), the CPU 30*a* selects an output color chip providing the minimum color difference from the designated color chip in response to the designation of the user who is comparing each of the output color chips of the respective parameters with the designated color chip by the subjective observation of the user's vision (step B50).

Thereafter, the CPU 30*a* carries out the UCR processing on the input color signal by using the parameter which is obtained in the above step B40 or B50 and which provides the minimum difference in color between the designated color chip and the output color chip (step B60)

Thereafter, the CPU 30*a* determines whether all of the input color signals are subjected to the UCR processing or not (step B70). If it is determined that all of the input color signals have not been subjected to the UCR processing (see NO route of step B70), the next pixel is made to undergo the UCR processing (step B80) and the processing is returned to step B60. Conversely, if it is confirmed that all of the input color signals have been subjected to the UCR processing (see YES route of step B70), the CPU 30*a* terminates the UCR processing.

As described above, according to the color image processing apparatus 100*a* as the first embodiment of the present invention, the parameter determining unit 34 determines a parameter which provides the minimum difference between the color signal before undergoing the UCR processing and the color signal after undergoing the UCR processing, and then the UCR processing is carried out on the input color signal by using the determined parameter. Therefore, the UCR processing can be carried out with a smooth color reproducibility, thereby eliminating unnatural discontinuity between adjacent pixels or unmatched color blending. Accordingly, it is possible to create a color image with a quality desired by the user.

Moreover, when the UCR processing is carried out in the color retaining mode, it is possible to suppress to the minimum the difference in color between the color signal before undergoing the UCR processing and the color signal after undergoing the UCR processing.

Furthermore, when the UCR processing is carried out in the color designating mode, the user can designate a designated color in advance and the user can obtain a parameter which provides the minimum difference in color between the color signal before undergoing the UCR processing and the color signal after undergoing the UCR processing for the color chip of the designated color. Therefore, it is possible to adjust arbitrarily the color image added with the K-separation.

(B) DESCRIPTION OF SECOND EMBODIMENT

Figure 5:
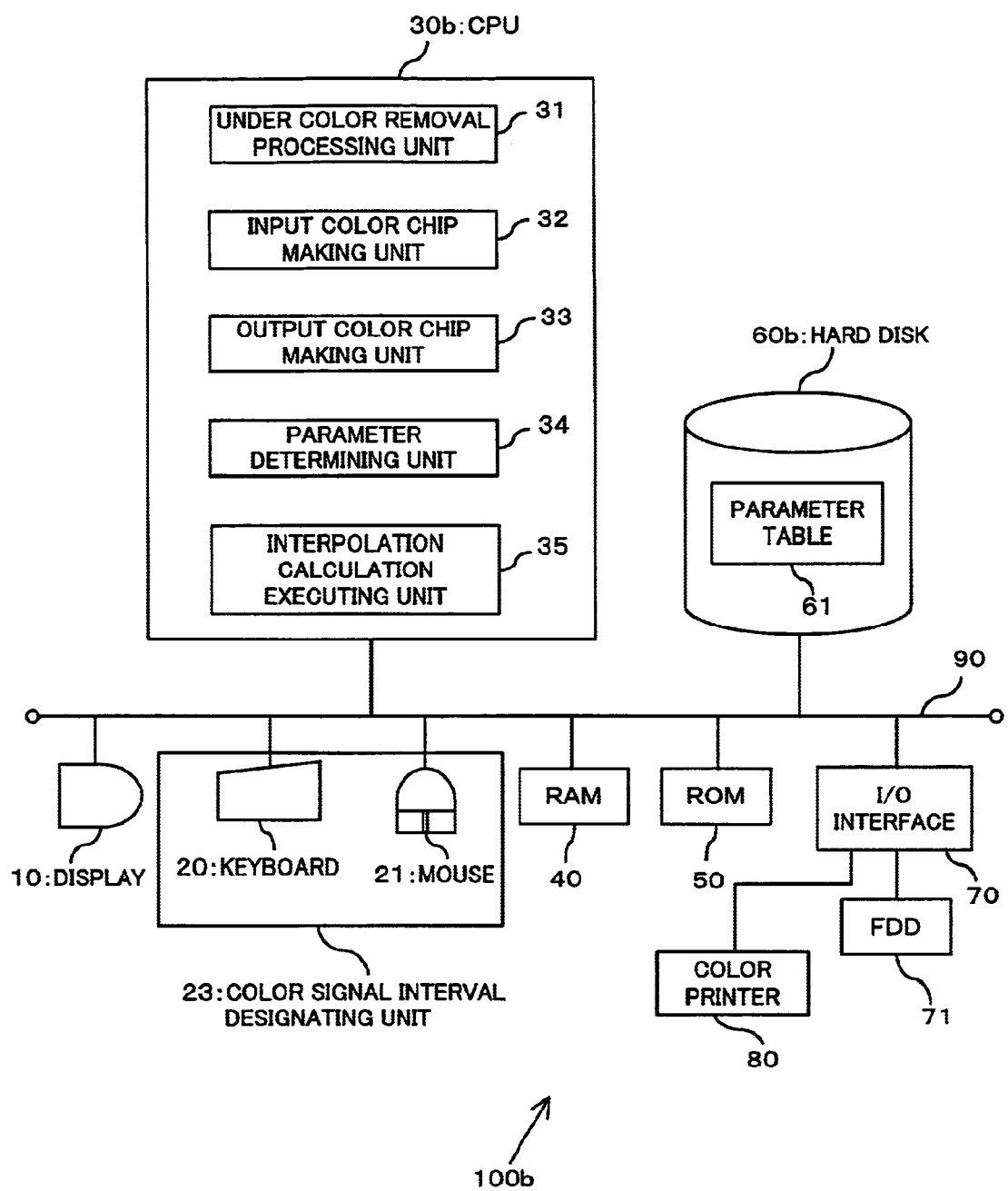
FIG. 5 is a block diagram showing a hardware arrangement of a color image processing apparatus together with a function arrangement thereof as a second embodiment of the present invention.

FIG. 5 is a block diagram showing the hardware arrangement of the color image processing apparatus together with the function arrangement thereof as a second embodiment of the present invention. As shown in FIG. 5, the color image processing apparatus 100*b* of the second embodiment is arranged to include a CPU 30*b* instead of the CPU 30*a* of the color image processing apparatus 100*a* shown in FIG. 1. Also, the color image processing apparatus 100*b* of the second embodiment is arranged to include a hard disk 60*b* instead of the hard disk 60 of the color image processing apparatus 100 a shown in FIG. 1.

In FIG. 5, like parts attached with the same reference numeral represent the same or substantially the same parts which have been described above. Therefore, they will not be described in detail.

Also in the second embodiment, respective color components of C, M, Y and K of the color signal are represented by eight-bit digit (ranging from 0 to 255) for convenience.

The keyboard 20 and the mouse 21 are devices for the user to carry out various command input or various data input. Therefore, when the user selectively designates a color chip of an arbitrary color signal included in the input color space, as a target of the UCR, the keyboard 20 and the mouse 21 can function as a designated color chip inputting unit 22. Further, the keyboard 20 and the mouse 21 can function as a color signal interval designating unit 23 when the user designates the color signal interval.

The CPU 30*b* is a unit for controlling the operation of the display 10, the hard disk 60*b* and the I/O interface 70. Also, the CPU 30*b* is arranged to execute various applications stored in the hard disk 60*b*, the RAM 40 and the ROM 50, whereby various arithmetic operations are carried out. More concretely, similarly to the CPU 30*a* of the color image processing apparatus 100*a* of the first embodiment described above, the CPU 30*b* is arranged to function as the under color removal processing unit 31, the input color chip making unit 32, the output color chip making unit 33, and the parameter determining unit 34. Also, the CPU 30*b* is arranged to function as the interpolation calculation executing unit 35.

Also, in the color image processing apparatus 100*b* of the second embodiment, the use can set the interval of the color signals (color signal intervals) by using the keyboard 20 or the mouse 21, when the input color chip making unit 32 (CPU 30*b*) makes a plurality of input color chips. In other words, the keyboard 20 or the mouse 21 is arranged to function as the color signal interval designating unit 23 for setting the color signal interval.

In regard to the above function, the input color chip making unit 32 is arranged such that the unit selects as a selected color signal, a plurality of color signals having a regular interval in the color signals designated by the color signal interval designating unit 23, and makes color chips of these selected color signals as an input color chip.

FIG. 6 is a diagram showing an example of an arrangement of the selected color signals (combination of the color signals). When the color signal interval is set to "32", for example, by means of the color signal interval designating unit 23 (keyboard 20 and the mouse 21), the CPU 30*b* selects a plurality of color signals in which color signal interval of respective color components of CMY is set to "32" as shown in FIG. 6.

Further, the color signal combinations, selected by the CPU 30b, are arranged to include the maximum value that each of the color components C, M, Y constituting the color signal can take, in addition to the color signals having the above color signal interval. (For example, as shown in FIG. 6, (C, M, Y)=(0, 0, 255), (255, 255, 255) and the like.)

While in the above description and FIG. 6, although there are examples of color signal combinations in which at least one of the signal value of the C, M and Y components constituting the color signal is "0", actually, the combination of the color signals containing "0" will not undergo the UCR processing in the under color removal processing unit 31.

Figure 7:
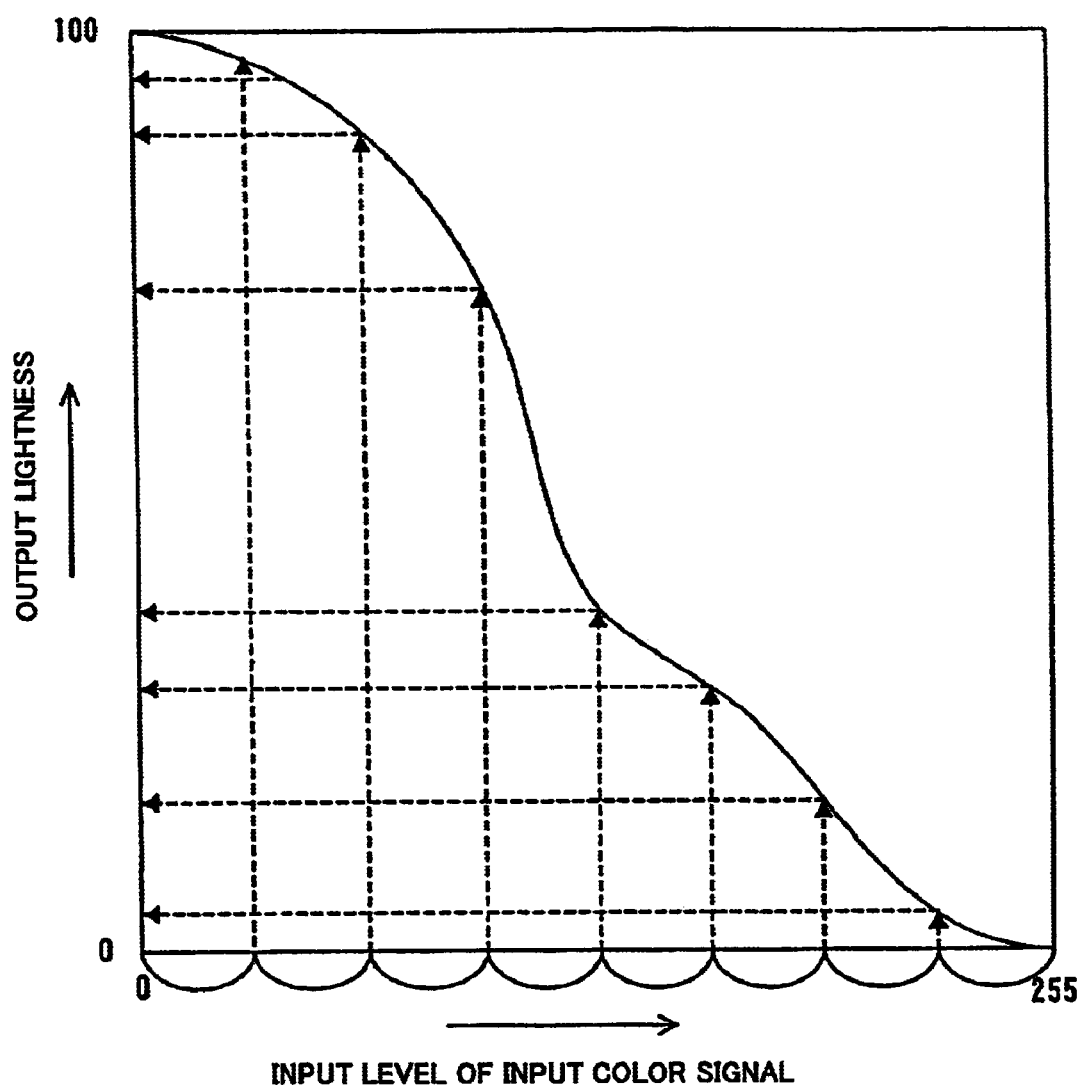
FIG. 7 is a diagram illustrative of the relation between the input level of input color signal and the output lightness.
Figure 8:
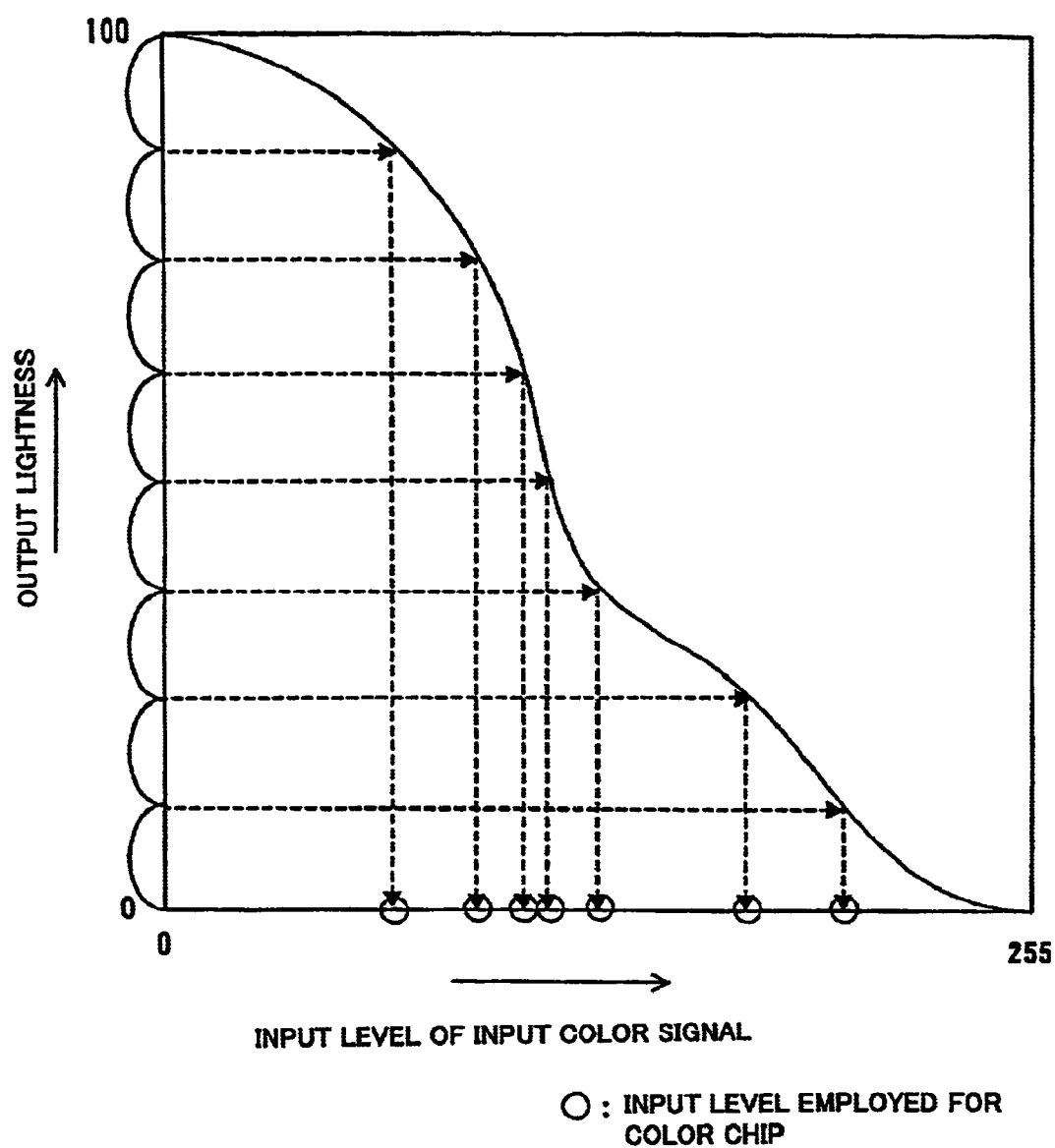
FIG. 8 is a diagram illustrative of the relation between the input level of input color signal and the output lightness.

FIGS. 7 and 8 are diagrams each illustrative of the relation between the input level of the input color signal and the output lightness. FIG. 7 is a diagram in which the color signal interval is set to "32" so that the input level is divided (into eight equal sections) on the input level axis, and the output lightness is plotted so as to correspond to the taken input levels. That is, in the example illustrated in FIG. 7, data for calculating the parameter is set to values having an interval (in FIG. 7, the value is 32) which vary linearly with respect to the input space.

Upon designating a color signal interval by the above-described color signal interval designating unit 23, color chips can be determined swiftly by setting the data for calculating a parameter as a linear interval, as shown in FIG. 7, with respect to the input space. Moreover, with such parameters which are linear with respect to the input space, the interpolation calculation for the output color space can be effected with ease, as will be described later on. With this, it is possible to attain smooth color reproducibility without conflict between colors or mismatching in color blending.

FIG. 8 is a diagram in which the color signal interval is set so that the output lightness is divided (into eight equal sections) on the output lightness axis. Namely, in the example illustrated in FIG. 8, the input levels are indicated when the data for calculating the parameters is made to have an interval proportional to the lightness curvature of the input color space.

When the color signal interval is designated by the above-described color signal interval designating unit 23, if the color signal interval is set as shown in FIG. 8, the parameter table which vary faithfully with the lightness change of the input signal, with the result that the parameter variation will become adaptable to a human sensation of vision on lightness. Moreover, when interpolation operation is effected on the output color signal as will be described later on, the conflict deriving from the interpolation operation will be made small and it becomes possible to attain smooth color reproducibility without mismatching in color blending.

Also in the color image processing apparatus 100b of the second embodiment, similarly to the color image processing apparatus 100a of the first embodiment, the UCR processing can be carried out based on two purposes, namely color designation (color designating mode) and color retention (color retaining mode).

The CPU 30b (under color removal processing unit 31) carries out the UCR processing by using two or more parameter for each of the above-described selected color signal (upon color retaining mode) and the designated color signal (color designating mode). Also, the CPU 30b (output color chip making unit 33) is arranged to print the color chip of the color signal after undergoing the UCR processing as the output color chip by using the color printer 80.

Further, the CPU 30b stores the parameters utilized for the UCR processing in the parameter table 61 (see FIG. 9) so that the parameters and the corresponding color signals are associated with each other. The parameter table 61 is stored in the hard disk 60b.

Figure 9:
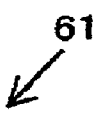
FIG. 9 is a diagram showing an example of a parameter table.

FIG. 9 is a diagram showing an example of the parameter table. As the parameters, held in the parameter table shown in FIG. 9, only UCR rate is utilized, particularly indicating an example in which the UCR rate=100%.

Figure 10:
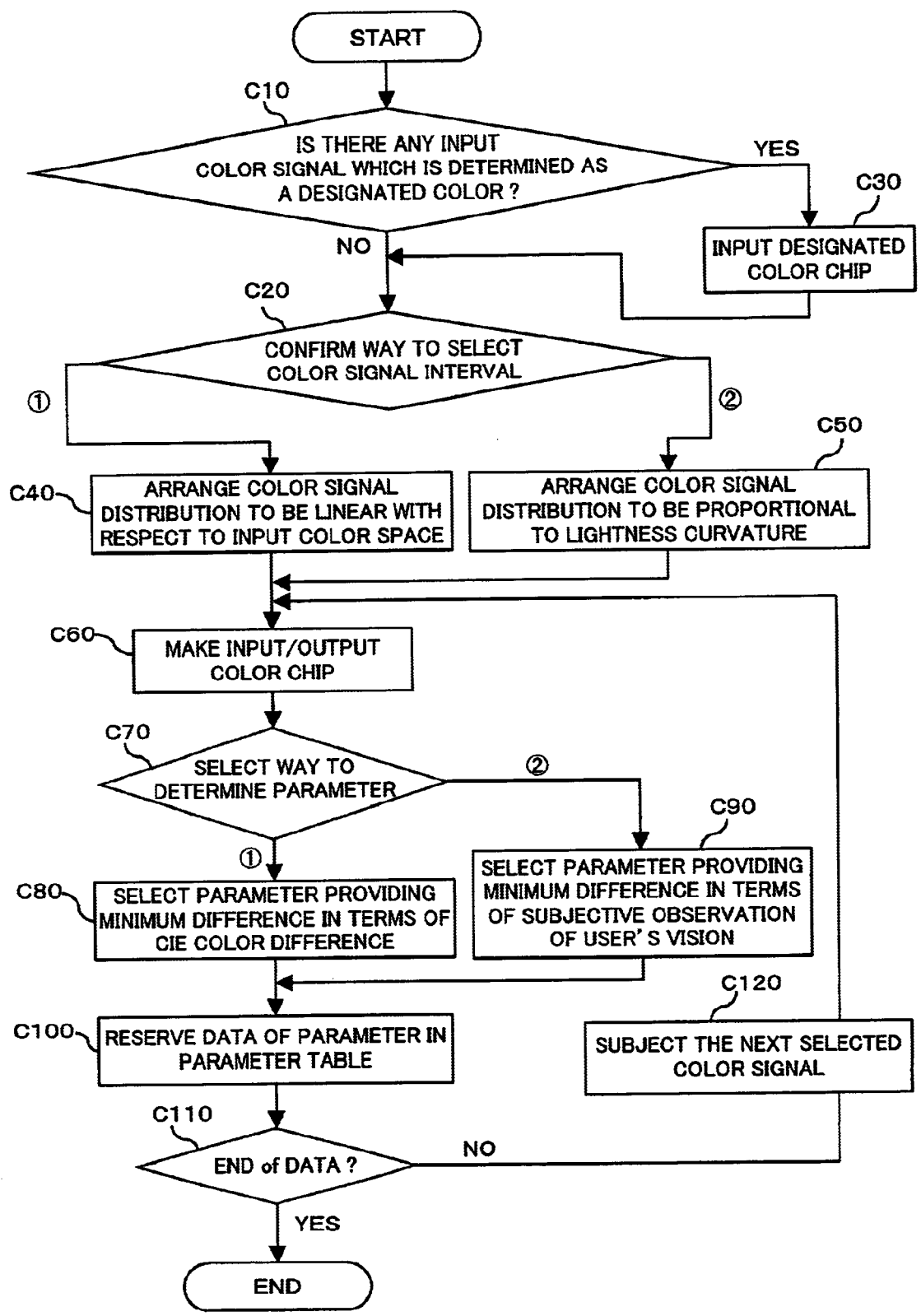
FIG. 10 is a flowchart for explaining the method of making a parameter table carried by a parameter determining unit.

The way in which the CPU 30b (parameter determining unit 34) makes the parameter table will hereinafter be described with reference to a flowchart of FIG. 10 (step C10 to C120).

Initially, the CPU 30b (parameter determining unit 34) determines whether or not there is any input color signal which is determined as a designated color in advance (step C10). If there is no designated color for the input signal (see NO route of step C10), then the CPU 30b confirms the way to select the color signal interval regarding the input color signals for which color is retained (step C20).

When the input signal processing is carried out in such a manner that the color signal interval is set as linear interval with respect to the input color space (see route ① of step C20), the CPU 30b selects a plurality of color signals having the color signal interval (see FIG. 7) as selected signals, based on the color signal interval data inputted through the color signal interval inputting unit 23 (the keyboard 20 and the mouse 21) by the user or based on the color signal interval data prepared in advance (step C40).

When the input signal processing is carried out regarding the color signal interval which is distributed proportionally to the lightness curvature (see route ② of step C20), the CPU 30b selects a plurality of color signals, distributed at an equal interval on the output lightness axis, as selected color signals, and then stores the selected color signals into the parameter table 61 (step C50).

On the other hand, if there is a color signal of a designated color (see YES route of step C10), the CPU 30b makes a color chip (designated color chip) regarding the color signal of which color is designated in advance (designated color signal) (step C30). Thereafter, the color signal is stored in the parameter table 61 and the processing is proceeded to step C20.

The CPU 30b then selects one color signal among the plurality of color signals stored in the parameter table 61, and makes a color chip (input color chip) of the selected color signal by using the color printer 80. At this time, as for the designated color signals, new color chip is not made and the pre-prepared color chip of the designated color is utilized.

Then, the CPU 30b effects the UCR processing on the selected color signal or the designated color signal by using two or more parameters, and further makes color chips (output color chips) of the color signal after undergoing the UCR processing for each parameter by using the color printer 80 (step C60).

Then, the CPU 30b confirms a way to determine the parameter (step C70). The user inputs a command for designating the way to determine the parameter by using the keyboard 20, the mouse 21 or the like. Data indicating the way to determine the parameter may be set in the system in advance.

At this time, if the user selects a way which designates a parameter providing the minimum difference in terms of CIE color difference, as the way to determine the parameter (see Route ① of step C70), the CPU 30b optically measures the input color chip or the designated color chip and all of the output color chips for the respective parameters and selects an output color chip providing the minimum difference among the input color chip or the designated color chip in terms of the CIE color difference (step C80).

Alternatively, if the user selects a way which designates a parameter providing the minimum difference in terms of the subjective observation of the user's vision (the bisection algorism) (see Route ② of step C70), the CPU 30b selects an output color chip providing the minimum color difference from the input color chip or the designated color chip in response to the designation of the user who is comparing all of the output color chips of the respective parameters with the input color chip or the designated color chip by the subjective observation of the user's vision (step C90).

Thereafter, the CPU 30b stores the parameters utilized for the UCR processing on the selected output color signal in the parameter table 61 so that the parameters are associated with the color signals before undergoing the UCR processing (step C100).

Then, the CPU 30b confirms whether or not all of the parameters, regarding all of the selected color signals which have been set in the parameter table 61 in step C40 and C50, are stored(step C110). If it is confirmed that not all of the parameters are stored in the parameter table 61 (see NO route of step C110), the next selected color signal is made to undergo the processing of steps C60 to C110 (step C120) and the processing is returned to step C60. On the other hand, if it is confirmed that all of the selected color signals are stored (see YES route of step C110), the CPU 30b terminates the processing of parameter storage. In this way, the foregoing series of processing is carried out to create the parameter table 61.

When the image signal (input color signal) is received, the CPU 30b determines whether the input color signal is held in the parameter table 61 or not. If it is determined that the input color signal is not held in the parameter table 61, the CPU 30b refers to another parameter of a color signal which is held in the parameter table 61. Then, a parameter suitable for the input color signal is calculated by interpolation calculation. As a way to find a parameter utilized for the interpolation calculation on the parameter table 61, a linear interpolation method, a polynomial approximation interpolation method (e.g., spline interpolation) or the like, are utilized.

That is, the CPU 30b is arranged to function as the interpolation calculation executing unit 35 for carrying out interpolation by calculating a parameter corresponding to a color signal which is not held in the parameter table 61.

Figure 11:
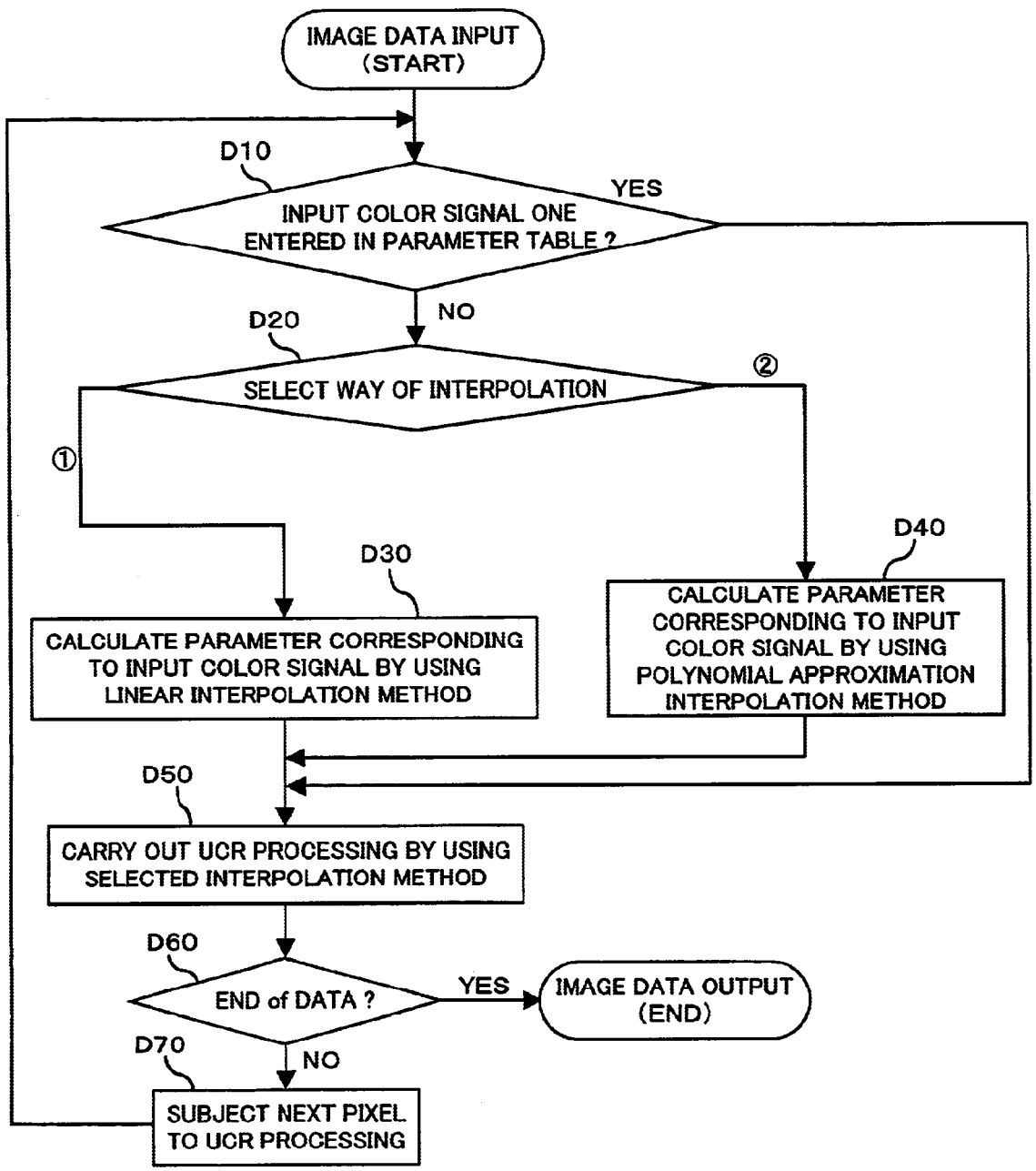
FIG. 11 is a flowchart for explaining the image processing carried out by a CPU in the color image processing apparatus as the second embodiment of the present invention.

Now description will be made on how the CPU 30b in the color image processing apparatus 100b of the second embodiment of the present invention, arranged as described above carries out the image processing, with reference to a flowchart of FIG. 11 (step D10 to D70).

When the CPU 30b receives the image signal (input color signal), the CPU 30b determines whether the input color signal is held in the parameter table 61 or not (step D10). If it is determined that the image signal is not held in the parameter table 61 (see NO route of step D10), then the CPU 30b confirms a way of interpolation for obtaining a parameter suitable for the input color signal by interpolation calculation (step D20). The way of interpolation for obtaining a parameter may be set in the system in advance or a way of interpolation for obtaining a parameter desired by the user may be inputted upon necessity.

If the linear interpolation method is selected as the way of interpolation (see ① route of step D20), then the CPU 30b refers to the color signals and parameters held in the parameter table 61 to calculate a parameter corresponding to the input color signal by using the linear interpolation method (step D30).

If the polynomial approximation interpolation method is selected as the way of interpolation (see ② route of step D20), then the CPU 30b refers to the color signals and parameters held in the parameter table 61 to calculate a parameter corresponding to the input color signal by using the polynomial approximation interpolation method (step D40).

Thereafter, the CPU 30b carries out the UCR processing on the input signal by using the parameter obtained by the interpolation calculation (step D50).

On the other hand, if the input signal is held in the parameter table 61 (see YES route of step D10), the CPU 30b obtains a parameter corresponding to the color signal from the parameter table 61, and carries out the UCR processing by using the parameter (step D50).

Thereafter, the CPU 30b confirms whether the all of the input color signals are subjected to the UCR processing or not (step D60). If it is determined that not all of the input color signals has been subjected to the UCR processing (see NO route of step D60), the next pixel is received to undergo the UCR processing (step D70) and the processing is proceeded to step D10. On the other hand, if it is confirmed that all of the input color signals have been subjected to the UCR processing (see YES route of step D60), the CPU 30a terminates the UCR processing and outputs an image having undergone the UCR processing.

As described above, according to the color image processing apparatus 100b of the second embodiment of the present invention, in addition to the above-described merit or advantage of the first embodiment of the present invention, the following merit or advantage can be obtained. That is, the color image processing apparatus 100b of the second embodiment is arranged to include the parameter table 61 for holding a suitable parameter for a particular color signal so that the parameter is associated with the color signal, wherein the parameter determining unit 34 selects, upon effecting the UCR processing on the input color signal, the parameter held in the parameter table 61 and carries out the UCR processing by using the selected parameter. Therefore, it is not necessary to calculate a parameter with respect to all of the input color signals, thereby decreasing the time to calculate the parameter, which serves to realize a UCR processing at a high speed. Moreover, the UCR processing can be carried out by using the most suitable parameter.

Further, regarding the input color signal which is not held in the parameter table 61, the interpolation calculation executing unit 35 calculates a parameter by interpolation calculation by using a color signal and a parameter held in the parameter table 61. In this way, it is possible to decrease the time to calculate the parameter, realizing a UCR processing at a high speed. Also, it is possible to achieve smooth color reproduction without conflict between colors or mismatching in color blending.

Further, since the interpolation calculation executing unit 35 carries out interpolation operation by using the linear interpolation arithmetic method, the interpolation operation can be carried out at high speed. Furthermore, the UCR processing can be carried out with smooth color reproducibility. Furthermore, since the interpolation calculation executing unit 35 carries out interpolation operation by using the polynomial approximation arithmetic method, the interpolation operation can be carried out at high accuracy and the UCR processing can be carried out with smooth color reproducibility.

Upon making the parameter table 61, the chromatic color interval can be designated by the color signal interval designating unit 23. Therefore, it is possible to adjust the number of color signals and parameters to be held in the parameter table 61. Moreover, it is possible to adjust the number of data utilized when the interpolation calculation executing unit 35 carries out interpolation calculation.

That is, by setting the color signal interval to be narrow, the probability at which interpolation calculation shall be executed is decreased and error deriving from the interpolation will be decreased. However, the number of processing for parameter calculation upon making the parameter table 61 will be increased. On the other hand, by setting the color signal interval to be wide, the probability at which interpolation calculation shall be executed is increased and error deriving from the interpolation will be increased. However, it is possible to decrease the number of processing for parameter calculation upon making the parameter table 61.

Therefore, it is desirable to adjust the color signal interval depending on the use of image processing, required accuracy of the same or the like.

(C) DESCRIPTION OF THIRD EMBODIMENT

Figure 12:
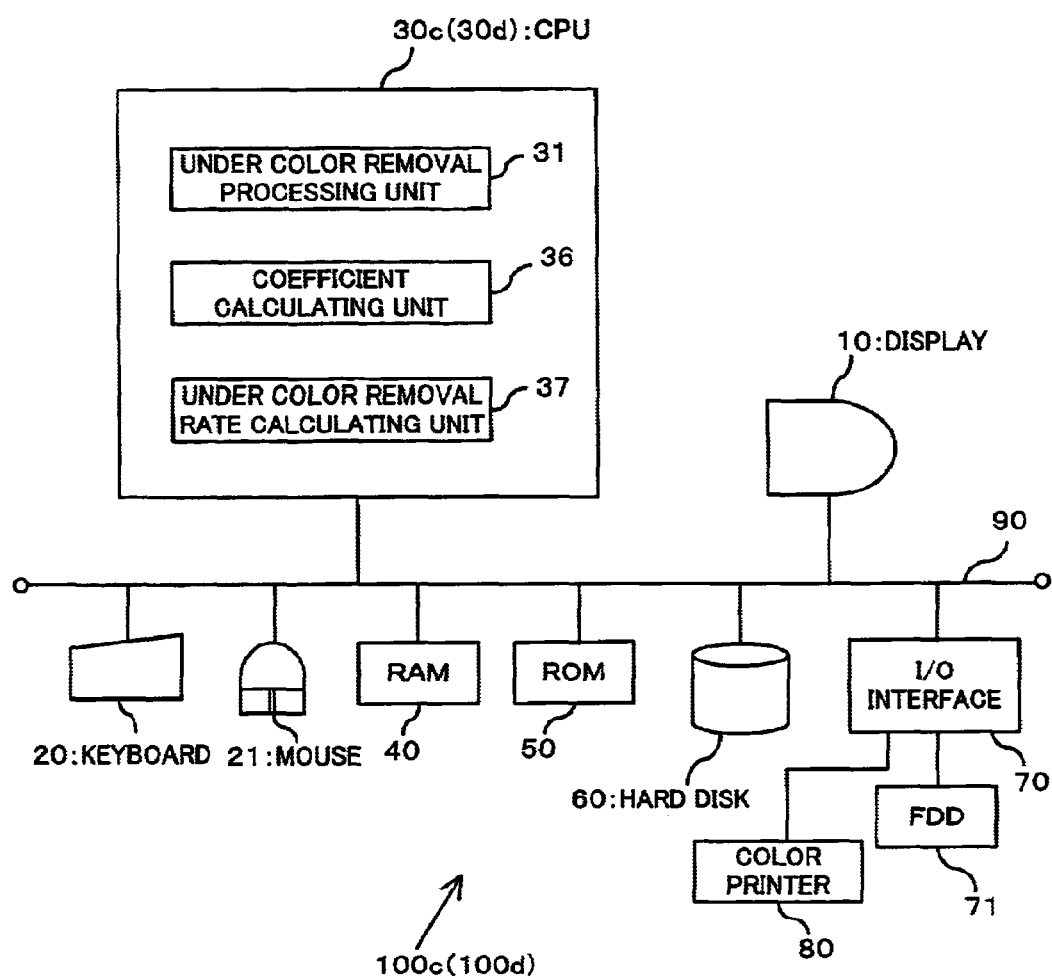
FIG. 12 is a block diagram showing a hardware arrangement of a color image processing apparatus together with a function arrangement thereof as a third embodiment of the present invention.

FIG. 12 is a block diagram showing the hardware arrangement of the color image processing apparatus 100c together with the function arrangement thereof as a third embodiment of the present invention. As shown in FIG. 12, the color image processing apparatus 100c of the third embodiment includes a CPU 30c instead of the CPU 30a of the color image processing apparatus shown in FIG. 1.

In FIG. 12, components attached with the same reference numerals as those of the aforesaid embodiments represent the same or the substantially the same components. Therefore, they will not be described in detail.

Also in the third embodiment, respective color components of C, M, Y and K of the color signal are represented by eight-bit digit (ranging from 0 to 255) for convenience.

Similarly to the CPU 30a of the color image processing apparatus 100a of the first embodiment, the CPU 30c of the color image processing apparatus 100c of the third embodiment is arranged to function as the under color removal processing unit 31 for effecting UCR processing on the input color signal.

Further, the CPU 30c calculates the maximum value and the minimum value of the input signals and determines a lightness coefficient and a saturation coefficient based on the maximum value and the minimum value of the input signals. That is, the CPU 30c is arranged to function as a coefficient calculating unit 36 for calculating the lightness coefficient and the saturation coefficient based on the input color signal. Also, the CPU 30c is arranged to function as an under color removal rate calculating unit 37 (hereinafter referred to as UCR rate calculating unit 37) for calculating the under color removal rate by using the lightness coefficient and the saturation coefficient determined by the coefficient calculating unit 36.

More concretely, the CPU 30c calculates the maximum value MAX (C, M, Y) and the minimum value MIN (C, M, Y) of the color components of the input signals. Then, the CPU 30c calculates a saturation coefficient S by dividing the minimum value MIN (C, M, Y) by the maximum value MAX (C, M, Y). In other words, the saturation coefficient S is calculated by the following equation (1).

$$\text{saturation coefficient } S = \text{MIN}(C, M, Y) \div \text{MAX}(C, M, Y) \tag{1}$$

On the other hand, the CPU 30c calculates a lightness coefficient M by calculating the following equation (2) using the minimum value MIN (C, M, Y) of the color components of the input signals, a concentration value SP at which the effect of the UCR processing becomes conspicuous, and the largest value MM that the input color signal can take. Meanwhile, the concentration value SP at which the effect of the UCR processing becomes conspicuous is a value to be settled in the system in advance. In the third embodiment, since the level of each of the color components, C, M, Y, K of the color signal is denoted by eight-bit digit, the largest value MM that the input color signal can take becomes 255.

$$\text{lightness coefficient } M = \{\text{MIN}(C, M, Y) - SP\} \div (MM - SP) \tag{2}$$

Further, the CPU 30c calculates the UCR rate (UCR rate) by multiplying the saturation coefficient S with the lightness coefficient M. That is, the UCR rate is given by the following equation (3).

$$UCR \text{ rate} = \text{saturation coefficient } S \times \text{lightness coefficient } M \tag{3}$$

For example, if the input signal takes a set of values, (C, M, Y)=(180, 200, 240), then the maximum value MAX (C, M, Y) and the minimum value MIN (C, M, Y) become MAX (C, M, Y)=240 and MIN (C, M, Y)=180. Thus, the saturation coefficient S is calculated as follows.

$$\text{saturation coefficient } S = \min(C, M, Y) \div \text{Max}(C, M, Y)$$
$$= 180 \div 240$$
$$= 0.75$$

Further, if the concentration value SP at which the effect of the UCR processing becomes conspicuous is set to 128, the lightness coefficient M is calculated as follows.

$$\text{lightness coefficient } M = \{\text{MIN}(C, M, Y) - SP\} \div (MM - SP)$$
$$= (180 - 128) \div (255 - 128)$$
$$= 0.4094$$

Further, the UCR rate is calculated as follows.

$$UCR \text{ rate} = \text{saturation coefficient } S \times \text{lightness coefficient } M$$
$$= 0.75 \times 0.4094$$
$$= 0.30705$$

The CPU 30c (under color removal processing unit 31) carries out the UCR processing on the input color signal by using the UCR rate obtained as described above. Therefore, it follows that the CPU 30c is arranged to function as the under color removal processing unit 31 for carrying out UCR processing on the input color signal by using the UCR rate which is calculated by the under color removal rate calculating unit 37.

The CPU 30c (UCR rate calculating unit 37) may be arranged to include a parameter which is calculated by the following equation (4) using the maximum UCR rate designated in advance, as a candidate of a parameter when the CPU 30c calculates the UCR rate.

UCR rate=saturation coefficient S×lightness coefficient M×maximum UCR rate (4)

Description will be made concretely on how the under color removal processing unit 31 calculates a set of color signals (Y', M', C', K) after undergoing the UCR processing by using the UCR rate calculated as described above. The under color removal processing unit 31 multiplies the minimum value MIN (C, M, Y) of the color component of the input color signal with the UCR rate, and then subtracts the value resulting from the multiplication from a signal value of each color component.

More concretely, the signal values of respective color components C', M', Y' can be given by the following equations, respectively.

$C'=C-\{MIN(C, M, Y) \times UCR \text{ rate}\}$ $M'=M-\{MIN(C, M, Y) \times UCR \text{ rate}\}$ $Y'=Y-\{MIN(C, M, Y) \times UCR \text{ rate}\}$ At this time, the amount of UCR is directly applied for determining the amount of K(black)-separation to be added to the color combination. Thus, the amount of K-separation can be expressed as follows.

$K'=MIN(C, M, Y) \times UCR \text{ rate}$

If the color component values and the UCR rate are determined as in the example described above, the color signal components (C', M', Y', K') after undergoing the UCR processing can be calculated as follows.

Figure 13:
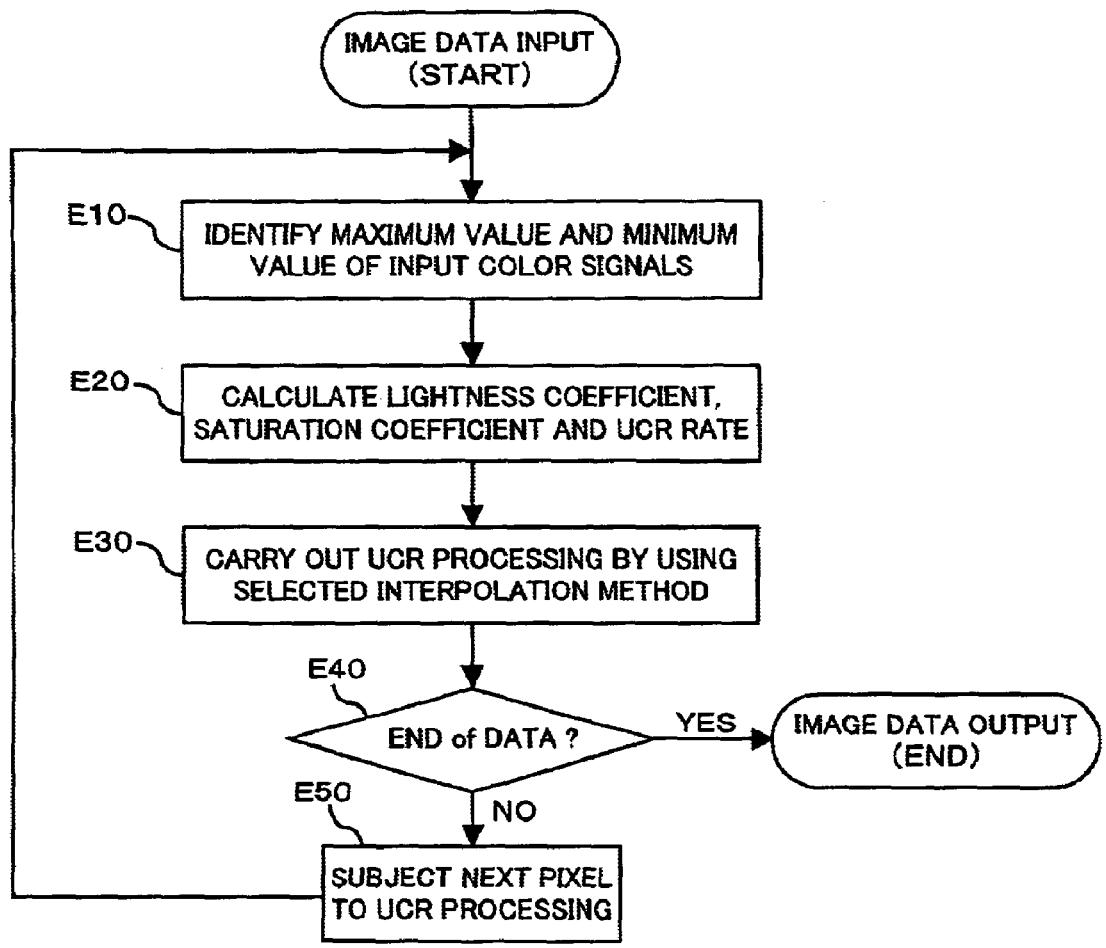
FIG. 13 is a flowchart for explaining the UCR processing, carried out on the input image (input color signal), in the color image processing apparatus as the third embodiment of the present invention.

$C'=180-(180 \times 0.30705)=127.7 \approx 125$ $M'=200-(180 \times 0.30705)=144.7 \approx 145$ $Y'=240-(180 \times 0.30705)=184.7 \approx 185$ $K=180 \times 0.30705 = 55.26 = 55$ Next, the UCR processing on the input image (input color signal) by the color image processing apparatus 100c as the third embodiment of the present invention with the above arrangement will be described with reference to a flowchart (step E10 to E50) of FIG. 13.

When the input color signal of the image to be subjected to the UCR processing is received, the CPU 30c identifies the maximum value MAX (C, M, Y) and the minimum value MIN (C, M, Y) of the color components of the input color signal (step E10). Then, the CPU 30c calculates the lightness coefficient M and the saturation coefficient S by using the maximum value MAX (C, M, Y) and the minimum value MIN (C, M, Y). Further, the CPU 30c calculates the UCR rate by using the lightness coefficient M and the saturation coefficient S (step E20).

Then, the CPU 30c carries out the UCR processing (UCR arithmetic operation) on the input color signal by using the obtained UCR rate (step E30). Thereafter, it is confirmed whether all of the input color signals are subjected to the UCR processing or not (step E40). If it is determined that not all of the input color signal has not been undergone the UCR processing (see NO route of step E40), the processing returns to step E10. Conversely, if it is confirmed that all of the input color signals has been subjected to the UCR processing (see YES route of step E40), the processing is terminated.

As described above, according to the color image processing apparatus 100c as the third embodiment of the present invention, the parameter (UCR rate) is calculated by using the saturation coefficient S and the lightness coefficient M which are calculated based on the color components of the input color signal. Therefore, an image after undergoing the UCR processing is made free from conflict between colors or mismatching in color blending upon outputting the image. Moreover, it becomes possible to realize smooth color reproduction without unnatural concentration jump between adjacent pixels in the saturation direction and the lightness direction. Thus, an image with a quality desired by the user can be formed.

(D) DESCRIPTION OF MODIFICATION OF COLOR IMAGE PROCESSING APPARATUS AS MODIFICATION OF THIRD EMBODIMENT

A color image processing apparatus 100d, as a modification of the third embodiment of the present invention, has a hardware arrangement similar to that of the color image processing apparatus 100c as the third embodiment of the present invention as shown in FIG. 12. Therefore, a diagram particularly showing the hardware arrangement of the modification of the third embodiment is not prepared and detail description thereof is omitted.

In the color image processing apparatus 100d as the modification of the third embodiment of the present invention, the user is allowed to designate a curvature which is variable with respect to the saturation coefficient S and the lightness coefficient M, respectively, by using the keyboard 20 and the mouse 21. A CPU 30d is arranged to calculate a lightness coefficient and a saturation coefficient based on the input color signal and the designated curvature.

More concretely, according to the arrangement of the modification of the third embodiment, the saturation coefficient S and the lightness coefficient M are determined based on respective exponential functions each having an index (a digit representing an exponent) (A1, A2), and the user designates in advance the digit representing the exponent to determine the saturation coefficient S and the lightness coefficient M.

Now description will be made on a case in which, for example, the input color signal takes a set of values, (C, M, Y)=(180, 200, 240), a curvature A1=1.5 is designated for determining the saturation coefficient S, and a curvature A2 =1.8 is designated for determining the lightness coefficient M. In this example, the maximum value of the input color signal is, MAX (C, M, Y)=240 and the minimum value of the input color signal is, MIN (C, M, Y)=180. The saturation coefficient S is calculated based on the input color signal and the index A1 as follows.

$$\text{saturation coefficient } S = \{\min(C, M, Y) \div \text{Max}(C, M, Y)\}^{A1}$$
$$= (180 \div 240)^{1.5}$$
$$= 0.650$$

Further, if the concentration value SP at which the effect of the UCR processing becomes conspicuous is set to 128, the lightness coefficient M is calculated based on the input color signal and the index A2 as follows.

$$\text{lightness coefficient } M = [\{\text{MIN}(C, M, Y) - SP\} \div (MM - SP)]^{A2}$$
$$= \{(180 - 128) \div (255 - 128)\}^{1.8}$$
$$\approx 0.200$$

Further, the UCR rate is calculated as follows.

$$UCR \text{ rate} = \text{saturation coefficient } S \times \text{lightness coefficient } M$$
$$= 0.650 \times 0.200$$
$$= 0.130$$

The CPU 30d (under color removal processing unit 31) carries out UCR processing on the input color signal by using the UCR rate obtained as described above. Therefore, it follows that the CPU 30d is arranged to function as the under color removal processing unit 31 for effecting UCR processing on the input color signal by using the UCR rate which is calculated by the under color removal rate calculating unit 37.

The CPU 30d (UCR rate calculating unit 37) may include a parameter which is calculated by the above-introduced equation (4) using the maximum UCR rate designated in advance, when the CPU 30 d calculates the UCR rate.

Now concrete description will be made on how the under color removal processing unit 31 carries out a method of calculating a set of color signal (Y', M', C', K) after undergoing the UCR processing using the UCR rate which was calculated in the above-described manner. The under color removal processing unit 31 subtracts a value deriving from multiplication of the minimum value MIN (C, M, Y) of the color components of the input color signal with the UCR rate from each of the signal values of respective color components.

More concretely, the signal values of respective color components C', M', Y' can be given by the following equations, respectively.

$$C' = C - \{\text{MIN}(C, M, Y) \times UCR \text{ rate}\}$$

$$M' = M - \{\text{MIN}(C, M, Y) \times UCR \text{ rate}\}$$

$$Y' = Y - \{\text{MIN}(C, M, Y) \times UCR \text{ rate}\}$$

At this time, the amount of UCR is directly applied for determining the amount of K(black)-separation. Thus, the amount of K-separation can be expressed as follows.

$$K' = \text{MIN}(C, M, Y) \times UCR \text{ rate}$$

If the color component values and the UCR rate are determined as in the example described above, the color signal components after undergoing the UCR processing can be calculated as follows.

$$C' = 180 - (180 \times 0.130) = 156.6 \approx 157$$

$$M' = 200 - (180 \times 0.130) = 176.6 \approx 177$$

$$Y' = 240 - (180 \times 0.130) = 216.6 \approx 217$$

$$K = 180 \times 0.130 = 23.4 \approx 23$$

Figure 14:
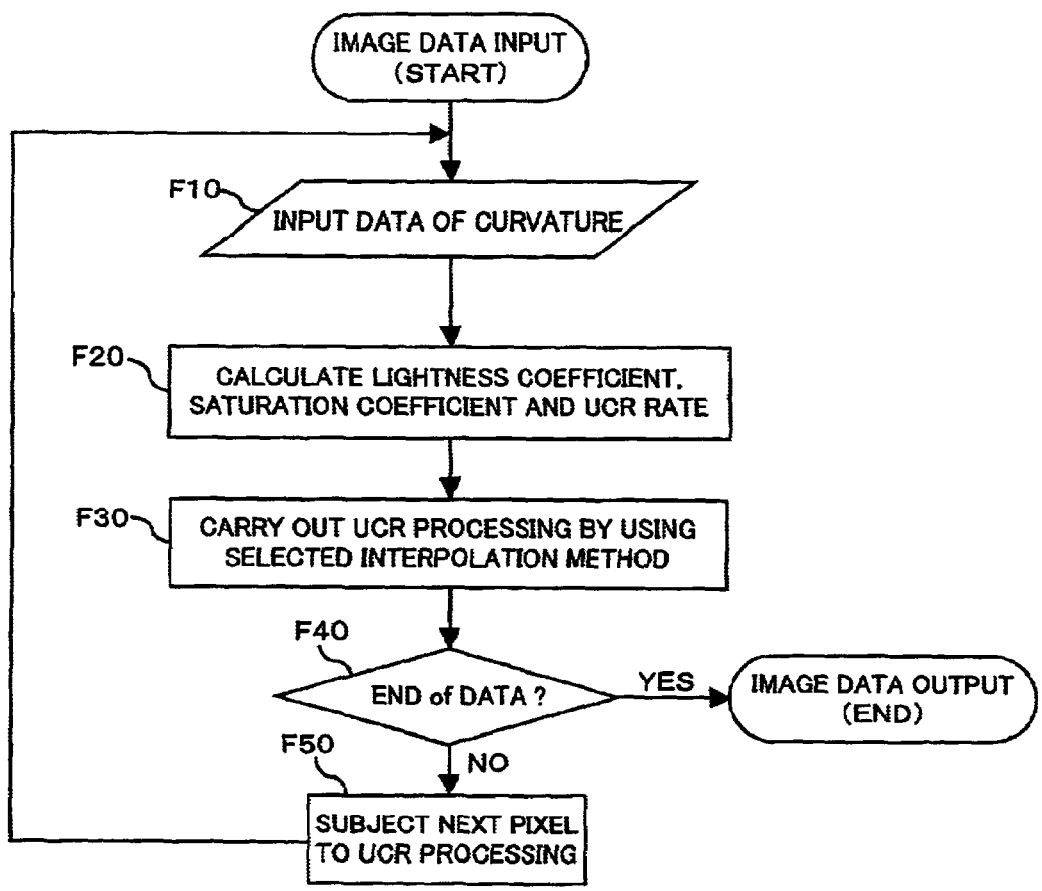
FIG. 14 is a flowchart for explaining the UCR processing, carried out on the input image (input color signal), in the color image processing apparatus as a modification of the third embodiment of the present invention.
Figure 15:
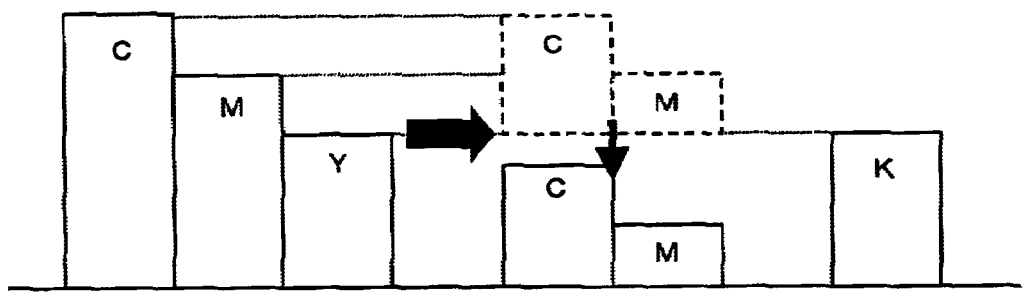
FIG. 15 is a diagram conceptually illustrative of a general UCR processing.

Next, the UCR processing on the input image (input color signal), by the color image processing apparatus 100d as the modification of the third embodiment of the present invention with the above arrangement, will be described with reference to a flowchart (step F10 to F50) of FIG. 14.

When the input color signal of the image to be subjected to the UCR processing is received, the CPU 30d obtains data of curvatures A1 and A2 which were designated by the user (step F10). Thereafter, the CPU 30d calculates the maximum value MAX (C, M, Y) and the minimum value MIN (C, M, Y) of the color components of the input color signal. Then, the CPU 30d calculates the lightness coefficient M and the saturation coefficient S by using the maximum value MAX (C, M, Y), the minimum value MIN (C, M, Y) and the data of curvatures A1 and A2. Further, the CPU 30d calculates the UCR rate by using the lightness coefficient M and the saturation coefficient S (step F20).

Then, the CPU 30d carries out the UCR processing (UCR arithmetic operation) on the input color signal by using the obtained UCR rate (step F30). Thereafter, it is confirmed whether all of the input color signals has been subjected to the UCR processing or not (step F40). If it is determined that there is still any input color signal which has not been undergone the UCR processing (see NO route of step F40), then the processing goes to the next pixel (step F50) and returns to step F10. On the other hand, if it is confirmed that all of the input color signals has been subjected to the UCR processing (see YES route of step F40), the processing is terminated.

As described above, according to the color image processing apparatus 100d as the modification of the third embodiment of the present invention, the user is allowed to designate in advance the indices, A1 and A2 for determining the saturation coefficient S and the lightness coefficient M. Therefore, in addition to the merits or advantages of the above-described third embodiment of the present invention, the user can adjust the values of the saturation coefficient S and the lightness coefficient M to adjust the degree of the effect of the UCR processing while retaining the smooth color reproducibility.

(E) OTHERS

While several embodiments and modifications have been described above, various changes and modifications thereof can be effected without departing from the gist of the present invention.

For example, while the above description has been made on the embodiments and modifications in which only the UCR rate is employed as the parameter, the mode of the present invention is not limited to the case but any value other than the UCR rate can be employed for the parameter.

While in the second embodiment (e.g., shown in FIG. 7) the color signal interval is set to 32, the color signal interval is not limited to the value but any other value may be set in as the interval. For example, a value of 16, 64, 128 or the like may be set as the interval. Similarly, while in the example shown in FIG. 8 the color signal interval is plotted so that respective values of the output lightness equally divide the axis of the output lightness, the way to plot the color signal interval is not limited to that way, but the color signal interval may be plotted in any manner to produce an arbitrary interval.

Further, in the above described modification of the third embodiment, the variable curvature settled for determining the saturation coefficient S and the lightness coefficient M are set so that A1=1.5 for the saturation coefficient S and A2=1.8 for the lightness coefficient M, respectively. However, selection of the values for the saturation coefficient S and the lightness coefficient M is not limited to the above case. That is, any values other than the above values may be set for the values of A1 and A2. Further, A1 and A2 may be expressed as a function of $1/\gamma(\gamma>0)$ and the value of $\gamma$ may be varied to determine the values of A1 and A2.

Further, while in the modification of the third embodiment a curvature A1 is set for the saturation coefficient S and a curvature A2 is set for the lightness coefficient M, the curvature need not be set for both of the saturation coefficient S and the lightness coefficient M. That is, the curvature may be set for only one of the saturation coefficient S and lightness coefficient M, for example.

Furthermore, in the first and second embodiments of the present invention, "a parameter providing the minimum difference in terms of CIE color difference" or "a parameter providing the minimum difference in terms of the subjective observation of the user's vision (the bisection algorism)" is employed as the way to determine the parameter. However, the way to determine the parameter is not limited to the ways but any mathematical method such as the Newton method or the secant method may be employed.

It is assumed that any person skilled in the art is able to implement the present invention based on the disclosure of respective embodiments of the present invention.

What is claimed is:

1. A color image processing apparatus having an under color removal processing unit for carrying out under color removal processing on an input color signal, comprising:
    an input color chip making unit for selecting a color signal as a selected color signal from an input color space as a target of under color removal, and printing out a color chip of the selected color signal as an input color chip;
    an output color chip making unit for printing out a color chip of a obtained color signal as an output color chip for each parameter by subjecting the selected color signal to the under color removal processing carried out in the under color removal processing unit with two or more parameters which are different from one another; and
    a parameter determining unit for selecting, from the parameters, a parameter which provides the minimum difference between the input color chip and the output color chip; wherein
    the under color removal processing unit carries out the under color removal processing on the input color signal by using the parameter selected by said parameter determining unit.

2. A color image processing apparatus according to claim 1, further comprising:
    a color signal interval designating unit for designating a color signal interval;
    a parameter table for holding therein the parameter, selected by said parameter determining unit and the color signal corresponding to the selected parameter so that the parameter and the color signal are associated with each other; and
    an interpolation calculation executing unit for calculating a parameter corresponding to a color signal which is not held in the parameter table, wherein
    said input color chip making unit selects a plurality of color signals which are arrayed at the interval designated by said color interval designating unit as the selected color signal, and making a color chip of the selected color signal as the input color chip, and
    said under color removal processing unit carries out the under color removal processing by using the parameter held in the parameter table or a parameter interpolated by said interpolation calculation executing unit.

3. A color image processing apparatus according to claim 2, wherein said color signal interval designating unit designates color signals arrayed at a regular interval in terms of the input level value of the color signal.

4. A color image processing apparatus according to claim 2, wherein said color signal interval designating unit designates color signals arrayed at a regular interval in terms of the output lightness of the color signal.

5. A color image processing apparatus according to claim 2, wherein said interpolation calculation executing unit calculates the parameter for interpolating a color signal which is not held in the parameter table by a linear interpolation method.

6. A color image processing apparatus according to claim 3, wherein said interpolation calculation executing unit calculates the parameter for interpolating a color signal which is not held in the parameter table by a linear interpolation method.

7. A color image processing apparatus according to claim 4, wherein said interpolation calculation executing unit calculates the parameter for interpolating a color signal which is not held in the parameter table by a linear interpolation method.

8. A color image processing apparatus according to claim 2, wherein said interpolation calculation executing unit calculates the parameter for interpolating a color signal which is not held in the parameter table by a polynomial approximation interpolation method.

9. A color image processing apparatus having an under color removal processing unit for carrying out under color removal processing on an input color signal, comprising:
    a designated color chip input unit capable of selectively designating a color chip of an arbitrary color signal within an input color space to be subjected to under color removal, as a designated color chip;
    an output color chip making unit for printing out a color chip of a obtained color signal as an output color chip for each parameter by subjecting the color signal corresponding to the designated color chip to the under color removal processing carried out in the under color removal processing unit with at least two parameters different from one another; and
    a parameter determining unit for selecting from the parameters a parameter which provides the minimum difference between the input color chip and the output color chip; wherein
    the under color removal processing unit carries out the under color removal on the input color signal by using the parameter selected by the parameter determining unit.

10. A color image processing apparatus having an under color removal processing unit for carrying out under color removal processing on an input color signal, comprising:
    a parameter determining unit for selecting a parameter which provides the minimum difference between an input color chip printed out based on a predetermined input color signal and an output color chip printed out based on the color signal obtained by subjecting the predetermined input color signal to the under color removal processing carried out in the under color removal processing unit; wherein
    said under color removal processing unit subjects the input color signal to the under color removal processing by using the parameter selected by said parameter determining unit.

11. A color image processing method for effecting under color removal processing on an input color signal, comprising the steps of:
- selecting a color signal as a selected color signal from an input color space as a target of under color removal, and printing out a color chip of the selected color signal as an input color chip;
- printing out a color chip of the obtained color signal after undergoing the under color removal processing as an output color chip for each parameter by subjecting the selected color signal to the under color removal processing with two or more parameters which are different from one another;
- selecting, from the parameters, a parameter which provides the minimum difference between the input color chip and the output color chip; and
- executing the under color removal processing on the input color signal by using the selected parameter.

12. A color image processing method according to claim 11, further comprising the steps of:
- designating a color signal interval;
- holding in a parameter table the selected parameter and the color signal corresponding to the selected parameter so that the parameter and said color signal are associated with each other;
- selecting a plurality of color signals which are arrayed at the designated interval as the selected color signal, and making a color chip of the selected color signal as the input color chip, and
- carrying out the under color removal processing by using the parameter held in the parameter table, and if the parameter corresponding to the input color signal is not held in the parameter table, making a parameter corresponding to the input color signal by the interpolation calculation and carrying out the under color removal processing by using the parameter made by the interpolation calculation.

13. A color image processing method according to claim 12, wherein said color signals are designated so that the color signals are arrayed at a regular interval in terms of the input level value of the color signal.

14. A color image processing method according to claim 12, wherein said color signals are designated so that the color signals are arrayed at a regular interval in terms of the output lightness of the color signal.

15. A color image processing method according to claim 12, wherein if said parameter corresponding to the input color signal is not held in the parameter table, a parameter corresponding to the input color signal is made by a linear interpolation method.

16. A color image processing method according to claim 13, wherein if the parameter corresponding to the input color signal is not held in the parameter table, a parameter corresponding to the input color signal is made by a linear interpolation method.

17. A color image processing method according to claim 14, wherein if the parameter corresponding to the input color signal is not held in the parameter table, a parameter corresponding to the input color signal is made by a linear interpolation method.20. A color image processing method according to claim 14, wherein if the parameter corresponding to the input color signal is not held in the parameter table, a parameter corresponding to the input color signal is made by a polynomial approximation interpolation method.

18. A color image processing method according to claim 12, wherein if the parameter corresponding to the input color signal is not held in the parameter table, a parameter corresponding to the input color signal is made by a polynomial approximation interpolation method.

19. A color image processing method for effecting under color removal processing on an input color signal, comprising the steps of:
- selectively designating as a designated color chip, a color chip printed out based on an arbitrary color signal within an input color space as a target of under color removal;
- printing out a color chip of the color signal after undergoing the under color removal processing as an output color chip for each parameter by subjecting the color signal corresponding to the designated color chip to the under color removal processing with two or more parameters different from one another;
- selecting, from the parameters, a parameter which provides the minimum difference between the input color chip and the output color chip; and
- subjecting the input color signal to the under color removal processing by using the selected parameter.

20. A color image processing method for effecting under color removal processing on an input color signal, comprising the steps of:
- selecting a parameter which provides the minimum difference between an input color chip printed out based on a predetermined input color signal and an output color chip printed out based on the color signal obtained by carrying out the under color removal processing on the predetermined input color signal; and
- carrying out the under color removal on the input color signal by using the selected parameter.

21. A color image processing apparatus having an under color removal processing unit for carrying out under color removal processing on an input color signal, comprising:
- an input color chip making unit for selecting a color signal as a selected color signal from an input color space as a target of under color removal, and making a color chip of the selected color signal as an input color chip;
- an output color chip making unit for making a color chip of the obtained color signal as an output color chip for each parameter by subjecting the selected color signal to the under color removal processing carried out in the under color removal processing unit with two or more parameters which are different from one another; and
- a parameter determining unit for selecting, from the parameters, a parameter which provides the minimum difference between the input color chip and the output color chip;
- a color signal interval designating unit for designating a color signal interval;
- a parameter table for holding therein the parameter, selected by said parameter determining unit and the color signal corresponding to the selected parameter so that the parameter and the color signal are associated with each other; and
- an interpolation calculation executing unit for calculating a parameter corresponding to a color signal which is not held in the parameter table,
- wherein the under color removal processing unit carries out the under color removal processing on the input color signal by using the parameter selected by said parameter determining unit, wherein said input color chip making unit selects a plurality of color signals which are arrayed at the interval designated by said color interval designating unit as the selected color signal, and making a color chip of the selected color signal as the input color chip, and wherein said under color removal processing unit carries out the under color removal processing by using the parameter held in the parameter table or a parameter interpolated by said interpolation calculation executing unit.

22. A color image processing method for effecting under color removal processing on an input color signal, comprising:

selecting a color signal as a selected color signal from an input color space as a target of under color removal, and making a color chip of the selected color signal as an input color chip;

making a color chip of the obtained color signal after undergoing the under color removal processing as an output color chip for each parameter by subjecting the selected color signal to the under color removal processing with two or more parameters which are different from one another;

selecting, from the parameters, a parameter which provides the minimum difference between the input color chip and the output color chip;

executing the under color removal processing on the input color signal by using the selected parameter;

designating a color signal interval;

holding in a parameter table the selected parameter and the color signal corresponding to the selected parameter so that the parameter and said color signal are associated with each other;

selecting a plurality of color signals which are arrayed at the designated interval as the selected color signal, and making a color chip of the selected color signal as the input color chip, and carrying out the under color removal processing by using the parameter held in the parameter table, and if the parameter corresponding to the input color signal is not held in the parameter table, making a parameter corresponding to the input color signal by the interpolation calculation and carrying out the under color removal processing by using the parameter made by the interpolation calculation.

* * * * *

UNITED STATES PATENT AND TRADEMARK OFFICE
CERTIFICATE OF CORRECTION

PATENT NO. : 7,027,195 B2
APPLICATION NO. : 09/791861
DATED : April 11, 2006
INVENTOR(S) : Akiko Nagae et al.

It is certified that error appears in the above-identified patent and that said Letters Patent is hereby corrected as shown below:

Col. 25, lines 60-64, after "method" delete "20. A color image processing method according to claim 14, wherein if the parameter corresponding to the input color signal is not held in the parameter table, a parameter corresponding to the input color signal is made by a polynomial approximation interpolation method."

Signed and Sealed this

Twelfth Day of September, 2006

JON W. DUDAS
*Director of the United States Patent and Trademark Office*